US012374729B2

(12) United States Patent
Onuki

(10) Patent No.: US 12,374,729 B2
(45) Date of Patent: Jul. 29, 2025

(54) TEMPERATURE RAISING DEVICE, TEMPERATURE RAISING PROGRAM, AND TEMPERATURE RAISING METHOD

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 610 days.

(21) Appl. No.: 17/674,874

(22) Filed: Feb. 18, 2022

(65) Prior Publication Data
US 2022/0320609 A1 Oct. 6, 2022

(30) Foreign Application Priority Data
Mar. 30, 2021 (JP) .................. 2021-057126

(51) Int. Cl.
*H01M 10/44* (2006.01)
*H01M 10/615* (2014.01)
(Continued)

(52) U.S. Cl.
CPC ....... *H01M 10/443* (2013.01); *H01M 10/615* (2015.04); *H01M 10/65* (2015.04); *H02J 7/0068* (2013.01); *H02J 7/02* (2013.01)

(58) Field of Classification Search
CPC .. H01M 10/443; H01M 10/615; H01M 10/65; H01M 10/635; H01M 10/0525;
(Continued)

(56) References Cited

U.S. PATENT DOCUMENTS 9,594,677 B2 * 3/2017 Ishii ................. G06F 16/30
11,692,522 B2 * 7/2023 Zheng ............... H01T 13/58
123/605
(Continued)

FOREIGN PATENT DOCUMENTS

CN 107666028 2/2018
CN 110970690 4/2020
(Continued)

OTHER PUBLICATIONS

Japanese Notice of Allowance for Japanese Patent Application No. 2021-057126 mailed Oct. 1, 2024.
(Continued)

*Primary Examiner* — M Baye Diao
(74) *Attorney, Agent, or Firm* — Amin, Turocy & Watson, LLP

(57) ABSTRACT

A temperature raising device includes a switch element control unit that executes a duty ratio control process of increasing one duty ratio which is one of duty ratios of a first switch element and a second switch element and a duty ratio of a third switch element from 0% from an initial state where the first switch element, the second switch element, and the third switch element are in a non-energized state, and decreasing another duty ratio which is another of the duty ratios of the first switch element and the second switch element and the duty ratio of the third switch element from 100% from the initial state by an increased amount of the one duty ratio which is one of the duty ratios of the first switch element and the second switch element and the duty ratio of the third switch element, with respect to an AC generation circuit including a first capacitor, a second capacitor, the first switch element, the second switch element, and the third switch element.

8 Claims, 18 Drawing Sheets

(51) Int. Cl.
   *H01M 10/65* (2014.01)
   *H02J 7/00* (2006.01)
   *H02J 7/02* (2016.01)

(58) Field of Classification Search
   CPC ...... H01M 10/06; H01M 10/30; H02J 7/0068;
   H02J 7/02; H02J 7/0063; Y02E 60/10
   USPC ........................................................ 320/107
   See application file for complete search history.

(56) References Cited

U.S. PATENT DOCUMENTS

| | | | |
|---|---|---|---|
| 12,074,305 B2 * | 8/2024 | Onuki | H01M 10/615 |
| 2009/0134851 A1 * | 5/2009 | Takeda | H02M 3/07 |
| | | | 323/234 |
| 2013/0033232 A1 * | 2/2013 | Kosugi | H01M 10/637 |
| | | | 320/128 |
| 2014/0329113 A1 * | 11/2014 | Han | H01M 10/4264 |
| | | | 429/7 |
| 2020/0207237 A1 | 7/2020 | Zuo et al. | |
| 2021/0245628 A1 * | 8/2021 | Zuo | B60L 58/25 |
| 2022/0021045 A1 * | 1/2022 | Onuki | H01M 10/625 |
| 2022/0131401 A1 | 4/2022 | Kobayashi et al. | |

FOREIGN PATENT DOCUMENTS

| | | | |
|---|---|---|---|
| JP | 2009-142069 | 6/2009 | |
| JP | 2012033351 A * | 2/2012 | ............ Y02E 60/10 |
| JP | 5225519 | 7/2013 | |
| JP | 2020-109754 | 7/2020 | |
| JP | 2021-012853 | 2/2021 | |

OTHER PUBLICATIONS

Chinese Office Action for Chinese Patent Application No. 202210164539.5 dated Mar. 1, 2025.

* cited by examiner (a) DUTY RATIOS OF FIRST SWITCH ELEMENT, SECOND SWITCH ELEMENT, AND THIRD SWITCH ELEMENT (b) VOLTAGE APPLIED TO SECONDARY BATTERY OR FIRST CAPACITOR AND SECOND CAPACITOR (c) CURRENT SUPPLIED TO SECONDARY BATTERY (d) LOSS THAT OCCURS IN FIRST SWITCH ELEMENT, SECOND SWITCH ELEMENT, OR THIRD SWITCH ELEMENT

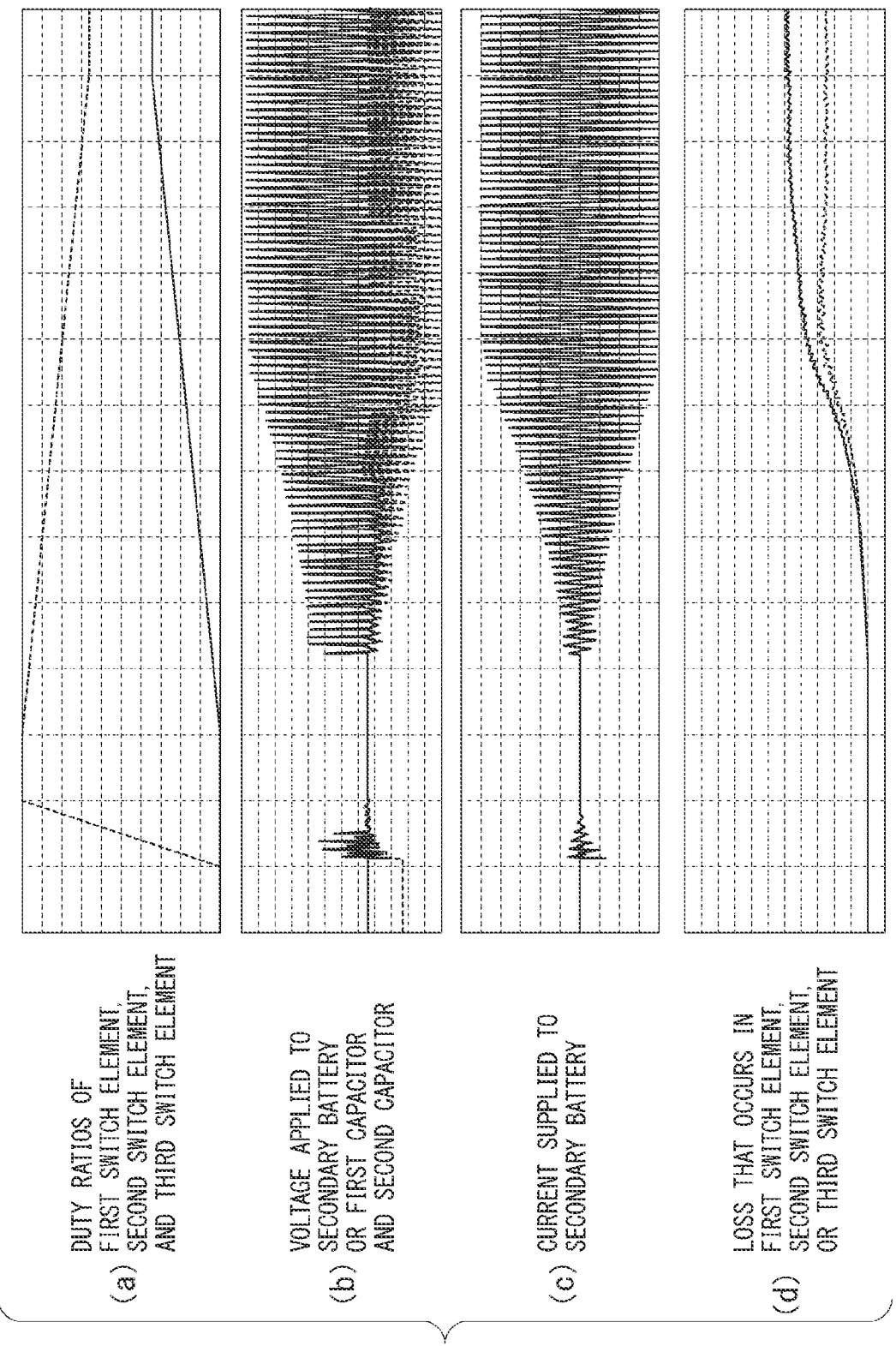

TEMPERATURE RAISING DEVICE, TEMPERATURE RAISING PROGRAM, AND TEMPERATURE RAISING METHOD

CROSS-REFERENCE TO RELATED APPLICATION

Priority is claimed on Japanese Patent Application No. 2021-057126, filed on Mar. 30, 2021, the contents of which are incorporated herein by reference.

BACKGROUND

Field of the Invention

The present invention relates to a temperature raising device, a temperature raising program and a temperature raising method.

Background

In the related art, a technique for raising the temperature of a secondary battery to a suitable temperature at which deterioration of the secondary battery is easily suppressed has been used. As an example of such a technique, for example, a charging/discharging device disclosed in Japanese Patent No. 5225519 can be mentioned.

This charging/discharging device controls charging and discharge of a power storage device and includes a heating determination unit and a heating control unit. The heating determination unit acquires the temperature of the power storage device when the power storage device is started and determines whether or not to heat the power storage device based on the temperature. When the heating determination unit makes a determination to heat the power storage device, the heating control unit controls the heating of the power storage device by obtaining the frequency characteristics of the resistance value of the internal resistance of the power storage device corresponding to the temperature and the state of charge of the power storage device, and performing control of alternately repeating charging and discharging of the power storage device in a charging/discharging cycle determined based on the frequency characteristics.

SUMMARY

However, in the above-described charging/discharging device, the loss that occurs in the circuit may increase depending on the method of controlling the switching element.

An object of an aspect of the present invention is to provide a temperature raising device, a temperature raising program, and a temperature raising method capable of reducing the loss that occurs in a circuit.

According to a first aspect of the present invention, a temperature raising device is provided including: a switch element control unit that executes a duty ratio control process of increasing one duty ratio which is one of duty ratios of a first switch element and a second switch element and a duty ratio of a third switch element from 0% from an initial state where the first switch element, the second switch element, and the third switch element are in a non-energized state, and decreasing another duty ratio which is another of the duty ratios of the first switch element and the second switch element and the duty ratio of the third switch element from 100% from the initial state by an increased amount of the one duty ratio which is one of the duty ratios of the first switch element and the second switch element and the duty ratio of the third switch element, with respect to an AC generation circuit including a first capacitor of which one terminal is connected to a terminal of a power storage body, the first switch element connected to another terminal of the first capacitor and the terminal of the power storage body, a second capacitor of which one terminal is connected to the terminal of the power storage body, the second switch element connected to the terminal of the power storage body and another terminal of the second capacitor, and the third switch element connected to the another terminal of the first capacitor and the another terminal of the second capacitor.

A second aspect is the temperature raising device according to the above-described first aspect, wherein the switch element control unit may execute the duty ratio control process with respect to the AC generation circuit in which at least one of the first switch element, the second switch element, and the third switch element has a parasitic diode.

A third aspect is the temperature raising device according to the above-described second aspect, wherein the switch element control unit may set a length of a dead time provided between a state where the first switch element and the second switch element are in an energized state and the third switch element is in a non-energized state, and a state where the first switch element and the second switch element are in a non-energized state and the third switch element is in an energized state, to be shorter than a predetermined value, and to be a length by which generation of a current exceeding a predetermined threshold value is avoidable.

A fourth aspect is the temperature raising device according to any one of the above-described first to third aspects, wherein the switch element control unit may execute the duty ratio control process with respect to the AC generation circuit in which a freewheeling diode is connected to at least one of the first switch element, the second switch element, and the third switch element.

A fifth aspect is the temperature raising device according to the above-described fourth aspect, wherein the switch element control unit may set a length of a dead time provided between a state where the first switch element and the second switch element are in an energized state and the third switch element is in a non-energized state, and a state where the first switch element and the second switch element are in a non-energized state and the third switch element is in an energized state, to be shorter than a predetermined value, and to be a length by which generation of a current exceeding a predetermined threshold value is avoidable.

A sixth aspect is the temperature raising device according to any one of the above-described first to fifth aspects, wherein the switch element control unit may execute the duty ratio control process with respect to the AC generation circuit in which at least one of the first switch element, the second switch element, and the third switch element is an insulated gate bipolar transistor or a metal oxide semiconductor field effect transistor.

According to a seventh aspect of the present invention, a computer-readable non-temporary recording medium is provided including: a temperature raising program that causes a computer to execute a switch element control function of executing a duty ratio control process of increasing one duty ratio which is one of duty ratios of a first switch element and a second switch element and a duty ratio of a third switch element from 0% from an initial state where the first switch element, the second switch element, and the third switch element are in a non-energized state, and decreasing another duty ratio which is another of the duty ratios of the first switch element and the second switch element and the duty ratio of the third switch element from 100% from the initial state by an increased amount of the one duty ratio which is one of the duty ratios of the first switch element and the second switch element and the duty ratio of the third switch element, with respect to an AC generation circuit including a first capacitor of which one terminal is connected to a terminal of a power storage body, the first switch element connected to another terminal of the first capacitor and the terminal of the power storage body, a second capacitor of which one terminal is connected to the terminal of the power storage body, the second switch element connected to the terminal of the power storage body and another terminal of the second capacitor, and the third switch element connected to the another terminal of the first capacitor and the another terminal of the second capacitor.

In an eighth aspect of the present invention, a temperature raising method is provided including: executing a duty ratio control process of increasing one duty ratio which is one of duty ratios of a first switch element and a second switch element and a duty ratio of a third switch element from 0% from an initial state where the first switch element, the second switch element, and the third switch element are in a non-energized state, and decreasing another duty ratio which is another of the duty ratios of the first switch element and the second switch element and the duty ratio of the third switch element from 100% from the initial state by an increased amount of the one duty ratio which is one of the duty ratios of the first switch element and the second switch element and the duty ratio of the third switch element, with respect to an AC generation circuit including a first capacitor of which one terminal is connected to a terminal of a power storage body, the first switch element connected to another terminal of the first capacitor and the terminal of the power storage body, a second capacitor of which one terminal is connected to the terminal of the power storage body, the second switch element connected to the terminal of the power storage body and another terminal of the second capacitor, and the third switch element connected to the another terminal of the first capacitor and the another terminal of the second capacitor.

According to the first to sixth aspects, the temperature raising device controls the AC generation circuit such that a through-current does not flow to the third switch element during a reverse recovery time of the parasitic diode of at least one of the first switch element and the second switch element. Otherwise, according to the first to sixth aspects, the temperature raising device controls the AC generation circuit such that a through-current does not flow to the third switch element during a reverse recovery time of a free-wheeling diode connected to at least one of the first switch element and the second switch element. Therefore, the temperature raising device can reduce the loss that occurs in the third switch element due to the flow of such a through-current.

BRIEF DESCRIPTION OF THE DRAWINGS

FIG. 25 is a view illustrating an example of change over time according to the second embodiment of the duty ratios of the first switch element, the second switch element, and the third switch element, a voltage applied to each of the power storage body, the first capacitor, and the second capacitor when the gate signal having the duty ratio is supplied to the AC generation circuit, a current supplied to the power storage body, and the loss that occurs in each of the first switch element, the second switch element, and the third switch element.

DESCRIPTION OF EMBODIMENTS

Hereinafter, examples of a temperature raising device, a temperature raising program, and a temperature raising method according to the present invention will be described with reference to the drawings.

Figure 1:
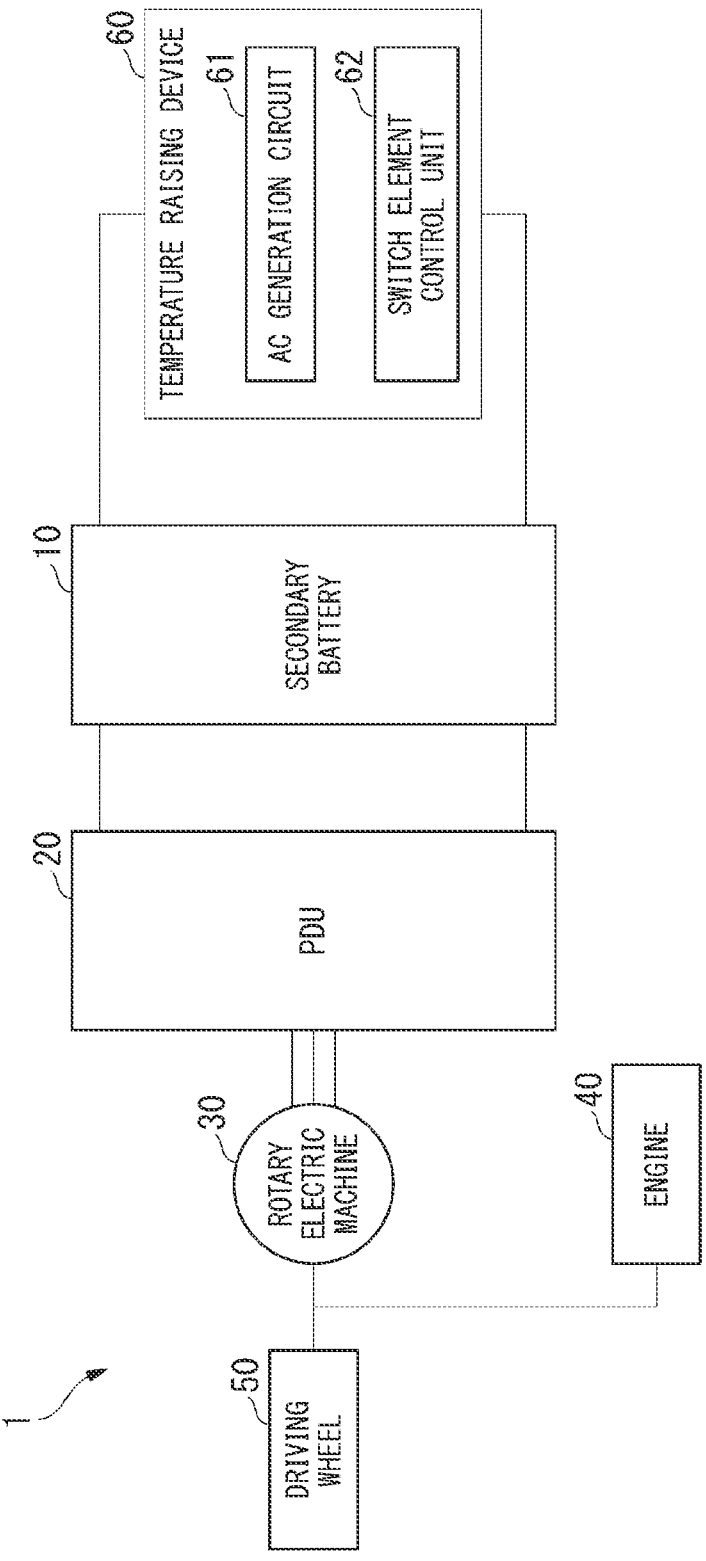
FIG. 1 is a diagram illustrating an example of a driving mechanism according to a first embodiment and a second embodiment.

First, a driving mechanism according to an example will be described with reference to FIGS. 1 to 3. FIG. 1 is a diagram illustrating an example of a driving mechanism according to a first embodiment and a second embodiment. A driving mechanism 1 illustrated in FIG. 1 is a mechanism for driving a moving body such as a two-wheeled, three-wheeled, or four-wheeled vehicle. As illustrated in FIG. 1, the driving mechanism 1 includes a power storage body 10, a power drive unit (PDU) 20, a rotary electric machine 30, an engine 40, a driving wheel 50, and a temperature raising device 60.

The power storage body 10 is, for example, a secondary battery, which generates and supplies DC power to the PDU 20. The PDU 20 includes a booster and an inverter. The PDU 20 boosts the DC power supplied from the power storage body 10 by a booster. Then, the PDU 20 converts the DC power boosted by the booster into three-phase AC power by the inverter and supplies the converted power to the rotary electric machine 30.

The rotary electric machine 30 includes a rotor and a stator. The rotary electric machine 30 functions as an electric motor that supplies power to the driving wheel 50 included in the moving body. Further, the rotary electric machine 30 may function as a generator that generates electricity by using the kinetic energy of the moving body while the moving body is decelerating. The engine 40 is, for example, a gasoline engine or a diesel engine, and supplies power to the driving wheel 50 included in the moving body.

The temperature raising device 60 raises the temperature of the power storage body 10 to a suitable operating temperature by passing an alternating current through the power storage body 10. As illustrated in FIG. 1, the temperature raising device 60 includes an AC generation circuit 61 and a switch element control unit 62.

Figure 2:
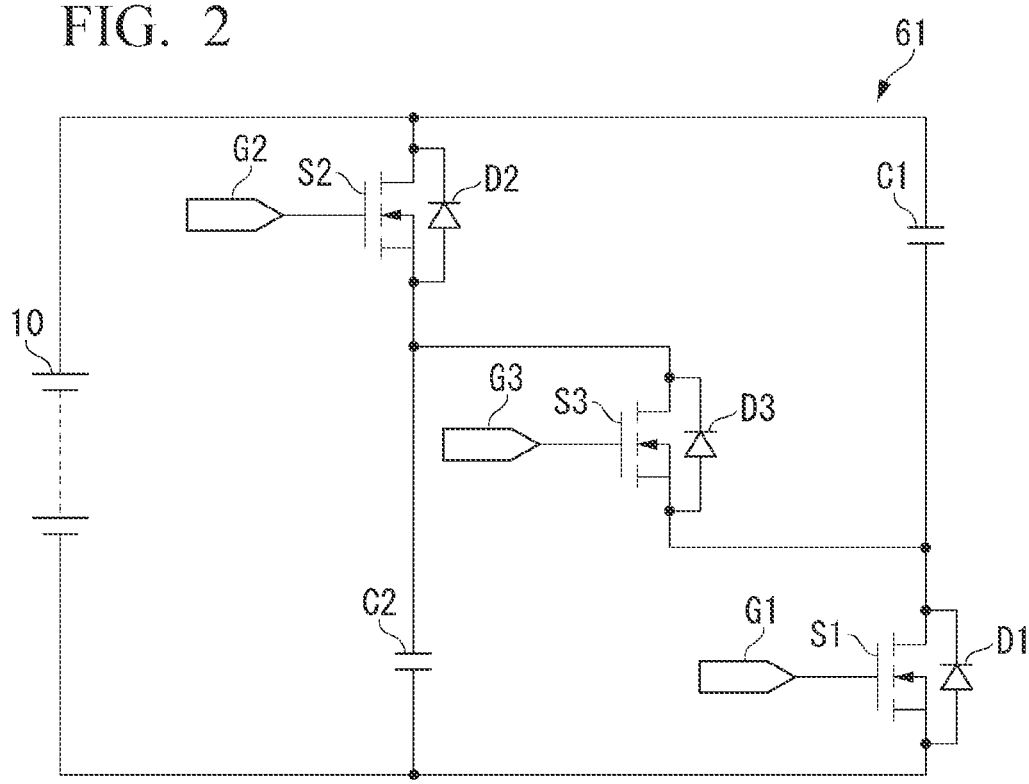
FIG. 2 is a diagram illustrating an example of an AC generation circuit controlled by a temperature raising device according to the first embodiment and the second embodiment.

FIG. 2 is a diagram illustrating an example of an AC generation circuit controlled by a temperature raising device according to the first embodiment and the second embodiment. As illustrated in FIG. 2, the AC generation circuit 61 includes a first capacitor C1, a second capacitor C2, a first switch element S1, a second switch element S2, a third switch element S3, a first diode D1, a second diode D2, a third diode D3, a first gate signal transmission unit G1, a second gate signal transmission unit G2, and a third gate signal transmission unit G3. Further, the first switch element S1, the second switch element S2, and the third switch element S3 are, for example, an N-type metal oxide semiconductor field effect transistor (MOSFET).

One terminal of the first capacitor C1 is connected to the positive electrode of the power storage body 10, and the other terminal is connected to the drain terminal of the first switch element S1 and the source terminal of the third switch element S3. In the first switch element S1, the drain terminal is connected to the other terminal of the first capacitor C1, and the source terminal is connected to the negative electrode of the power storage body 10 and one terminal of the second capacitor C2. In the second capacitor C2, one terminal is connected to the negative electrode of the power storage body 10 and the source terminal of the first switch element S1, and the other terminal is connected to the source terminal of the second switch element and the drain terminal of the third switch element S3. Further, the electrostatic capacity of the first capacitor C1 and the electrostatic capacity of the second capacitor C2 are equal to each other.

In the second switch element S2, the drain terminal is connected to the positive electrode of the power storage body 10 and one terminal of the first capacitor C1, and the source terminal is connected to the other terminal of the second capacitor C2 and the drain terminal of the third switch element S3. In the third switch element S3, the drain terminal is connected to the source terminal of the second switch element S2 and the other terminal of the second capacitor C2, and the source terminal is connected to the drain terminal of the first switch element S1 and the other terminal of the first capacitor C1.

The first diode D1 is a freewheeling diode connected to the first switch element S1, the cathode terminal is connected to the drain terminal of the first switch element S1, and the anode terminal is connected to the source terminal of the first switch element S1. The second diode D2 is a freewheeling diode connected to the second switch element S2, the cathode terminal is connected to the drain terminal of the second switch element S2, and the anode terminal is connected to the source terminal of the second switch element S2. The third diode D3 is a freewheeling diode connected to the second switch element S2, the cathode terminal is connected to the drain terminal of the third switch element S3, and the anode terminal is connected to the source terminal of the third switch element S3.

The first gate signal transmission unit G1 is connected to the gate terminal of the first switch element S1 and applies a high or low voltage to the gate terminal of the first switch element S1. The second gate signal transmission unit G2 is connected to the gate terminal of the second switch element S2 and applies a high or low voltage to the gate terminal of the second switch element S2. The third gate signal transmission unit G3 is connected to the gate terminal of the third switch element S3 and applies a high or low voltage to the gate terminal of the third switch element S3.

When a high voltage is applied to the gate terminal, any of the first switch element S1, the second switch element S2, and the third switch element S3 has high conductance between the source terminal and the drain terminal and are in an energized state to pass a current. In addition, when a low voltage is applied to the gate terminal, any of the first switch element S1, the second switch element S2, and the third switch element S3 has low conductance between the source terminal and the drain terminal, and are in a non-energized state not to pass a current.

Therefore, when a high voltage is applied to the gate terminal of the first switch element S1 and the gate terminal of the second switch element S2 and a low voltage is applied to the gate terminal of the third switch element S3, the first capacitor C1 and the second capacitor C2 are connected to each other in parallel. In addition, when a low voltage is applied to the gate terminal of the first switch element S1 and the gate terminal of the second switch element S2 and a high voltage is applied to the gate terminal of the third switch element S3, the first capacitor C1 and the second capacitor C2 are connected to each other in series. Further, between the period during which the high voltage is applied to the gate terminal of the first switch element S1 and the gate terminal of the second switch element S2 and the period during which the high voltage is applied to the gate terminal of the third switch element S3, a dead time, which is a period during which all of the first switch element S1, the second switch element S2, and the third switch element S3 are in a non-energized state, is provided.

Figure 3:
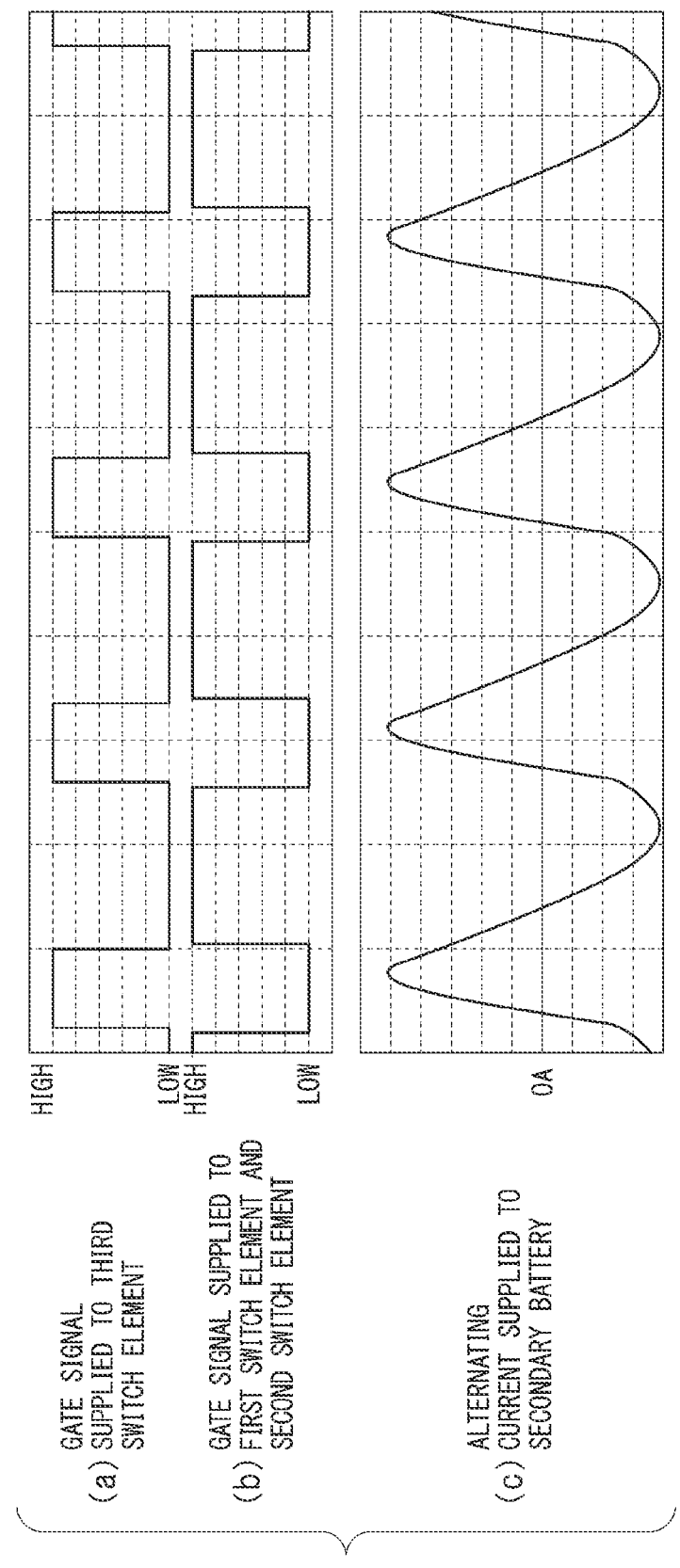
FIG. 3 is a view illustrating an example of a gate signal supplied to a first switch element, a second switch element, and a third switch element, which are included in the AC generation circuit according to the first embodiment and the second embodiment, and an alternating current supplied to a power storage body by the AC generation circuit.

FIG. 3 is a view illustrating an example of a gate signal supplied to a first switch element, a second switch element, and a third switch element, which are included in the AC generation circuit according to the first embodiment and the second embodiment, and an alternating current supplied to a power storage body by the AC generation circuit.

In FIG. 3A, the horizontal axis represents time, and the vertical axis represents the high or low voltage applied to the gate terminal of the third switch element S3. In FIG. 3B, the horizontal axis represents time, and the vertical axis represents the high or low voltage applied to the gate terminals of the first switch element S1 and the second switch element S2. The cycle of the gate signal illustrated in FIG. 3A is equal to the cycle of the gate signal illustrated in FIG. 3B. In FIG. 3C, the horizontal axis represents time, and the vertical axis represents the current supplied to the power storage body 10 by the AC generation circuit 61.

The resonance frequency of the AC generation circuit 61 when the first capacitor C1 and the second capacitor C2 are connected to each other in series depends on the inductance component of the power storage body 10 and is a frequency approximately twice the resonance frequency of the AC generation circuit 61 when both are connected to each other in parallel. Therefore, as illustrated in FIGS. 3A and 3B, the ratio of the time when a high voltage is applied to the gate terminal of the third switch element S3 and the time when a high voltage is applied to the gate terminal of the first switch element S1 and the gate terminal of the second switch element S2 is 1:2. Accordingly, the AC generation circuit 61 can supply the alternating current that resonates with relatively high accuracy as illustrated in FIG. 3C, to the power storage body 10. In addition, FIG. 3C illustrates the current in the direction of charging the power storage body 10 as a positive current.

The switch element control unit 62 executes a duty ratio control process which will be described later. The switch element control unit 62 is realized, for example, by executing a control program in which a hardware processor such as a central processing unit (CPU) is realized as software. At least a part of the switch element control unit 62 may be realized by hardware (circuit unit including circuitry) such as large-scale integration (LSI), application specific integrated circuit (ASIC), and field-programmable gate array (FPGA), or graphics processing unit (GPU), or may be realized by the cooperation of software and hardware.

Comparative Example

Next, a process in which the switch element control unit included in the temperature raising device according to a comparative example controls the AC generation circuit 61 will be described with reference to FIGS. 4 to 9.

Figure 4:
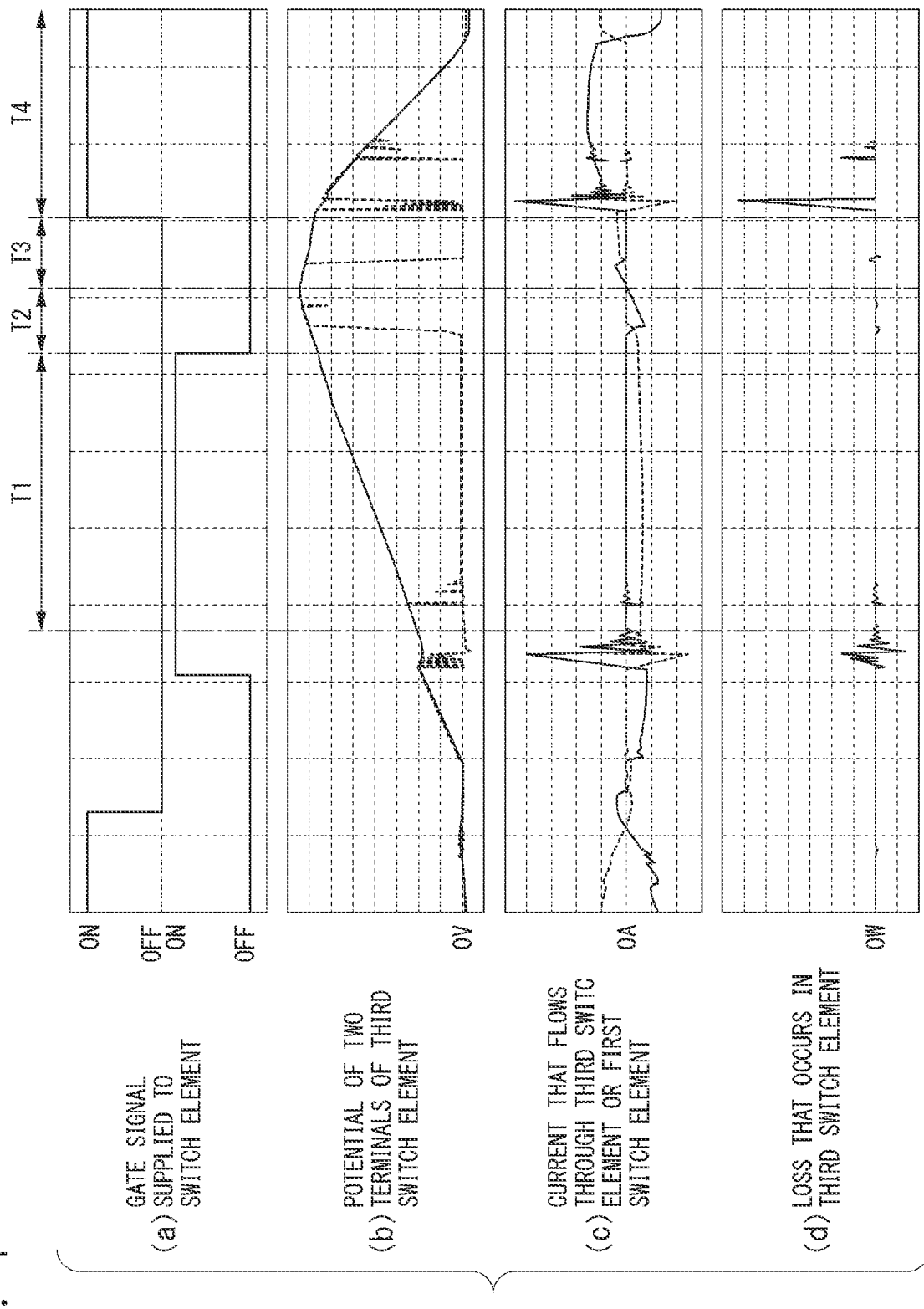
FIG. 4 is a view illustrating an example of a gate signal supplied to the three switch elements by a temperature raising device according to a comparative example, potentials of two terminals of the third switch element when the gate signal is supplied, a current that flows through the third switch element and a current that flows through the first switch element when the gate signal is supplied, and a loss that occurs in the third switch element.

FIG. 4 is a view illustrating an example of a gate signal supplied to the three switch elements by a temperature raising device according to a comparative example, potentials of two terminals of the third switch element when the gate signal is supplied, a current that flows through the third switch element and a current that flows through the first switch element when the gate signal is supplied, and a loss that occurs in the third switch element. Further, FIG. 4 illustrates a first period T1, a second period T2, a third period T3, and a fourth period T4.

FIG. 4A illustrates changes over time in the high or low voltage applied to the gate terminals of the first switch element S1, the second switch element S2, and the third switch element S3. Specifically, FIG. 4A illustrates the change over time in the voltage applied to the gate terminal of the third switch element S3 by a solid line in the upper row, and illustrates the change over time in the voltage applied to the gate terminal of the first switch element S1 and the gate terminal of the second switch element S2 by a solid line in the lower row. The switch element control unit included in the temperature raising device according to the comparative example supplies the gate signal illustrated in FIG. 4A to the gate terminals of the first switch element S1, the second switch element S2, and the third switch element S3.

Further, when the first switch element S1, the second switch element S2, and the third switch element S3 are in a conductive state at the same time, a short-circuit current is generated, and thus the first switch element S1, the second switch element S2, and the third switch element S3 must be in an exclusively conductive state. It is necessary to set a time width, that is, a dead time, during which all of the switch elements are in a non-conductive state in consideration of the response delay of the switch element, and in FIG. 4A, the second period T2 and the third period T3 correspond to the dead time.

FIG. 4B illustrates the change over time in the potential of the drain terminal of the third switch element S3 when the voltage illustrated in FIG. 4A is applied to each of the gate terminals of the three switch elements by a solid line. In addition, FIG. 4B illustrates the change over time in the potential of the source terminal of the third switch element S3 when the voltage illustrated in FIG. 4A is applied to each of the gate terminals of the three switch elements by a dotted line.

FIG. 4C illustrates the change over time in the current that flows into the drain terminal of the third switch element S3 when the voltage illustrated in FIG. 4A is applied to each of the gate terminals of the three switch elements by a solid line. When the current flows into the drain terminal of the third switch element S3, the current becomes a positive current, and becomes the total current of the current that flows through the third switch element S3 and the current that flows through the third diode D3. Further, FIG. 4C illustrates the change over time in the current that flows into the source terminal of the first switch element S1 when the voltage illustrated in FIG. 4A is applied to each of the gate terminals of the three switch elements by a dotted line. When the current flows into the source terminal of the first switch element S1, the current becomes a positive current and becomes the total current of the current that flows through the first switch element S1 and the current that flows through the first diode D1.

FIG. 4D illustrates the change over time in the loss that occurs by the through-current that flows to the third switch element S3 when the voltage illustrated in FIG. 4A is applied to each of the gate terminals of the three switch elements by a solid line.

Figure 5:
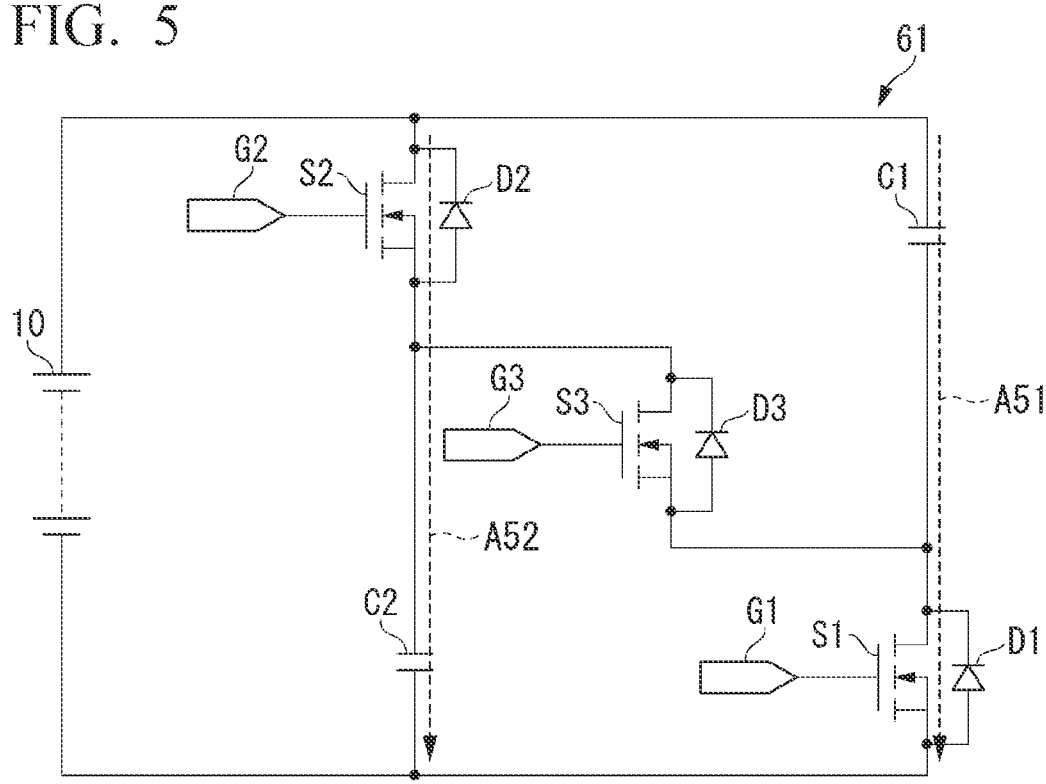
FIG. 5 is a diagram illustrating an example of a current that flows through the AC generation circuit in a first period illustrated in FIG. 4.

FIG. 5 is a diagram illustrating an example of a current that flows through the AC generation circuit in a first period illustrated in FIG. 4. In the first period T1 illustrated in FIG. 4, the first switch element S1 and the second switch element S2 are in an energized state, the third switch element S3 is in a non-energized state, and thus the first capacitor C1 and the second capacitor C2 are connected to each other in parallel. Therefore, the current flows as illustrated by arrows A51 and A52 in FIG. 5. The first capacitor C1 and the second capacitor C2 are charged by this current.

Further, since the first switch element S1 is in an energized state during the first period T1 illustrated in FIG. 4, the potential of the source terminal of the third switch element S3 is equal to the potential of 0 V (volt) of the negative electrode of the power storage body 10, as illustrated by a dotted line in FIG. 4B. During the first period T1 illustrated in FIG. 4, the second capacitor C2 continues to be charged, and the voltage applied to the second capacitor C2 continues to rise. Thus the potential of the drain terminal of the third switch element S3 continues to increase as illustrated with a solid line in FIG. 4B.

Further, since the third switch element S3 is in a non-energized state during the first period T1 illustrated in FIG. 4, the current that flows into the drain terminal of the third switch element S3 is substantially 0 A (ampere) as illustrated by a solid line in FIG. 4C. Since the first switch element S1 is in an energized state during the first period T1 illustrated in FIG. 4, the current that flows into the source terminal of the first switch element S1 becomes a substantially constant and negative current as illustrated by a dotted line in FIG. 4C.

Further, since the current that flows into the third switch element S3 is substantially 0 A during the first period T1 illustrated in FIG. 4, the loss that occurs by the through-current that flows through the third switch element S3 is substantially 0 W (watts) as illustrated by a solid line in FIG. 4D.

Figure 6:
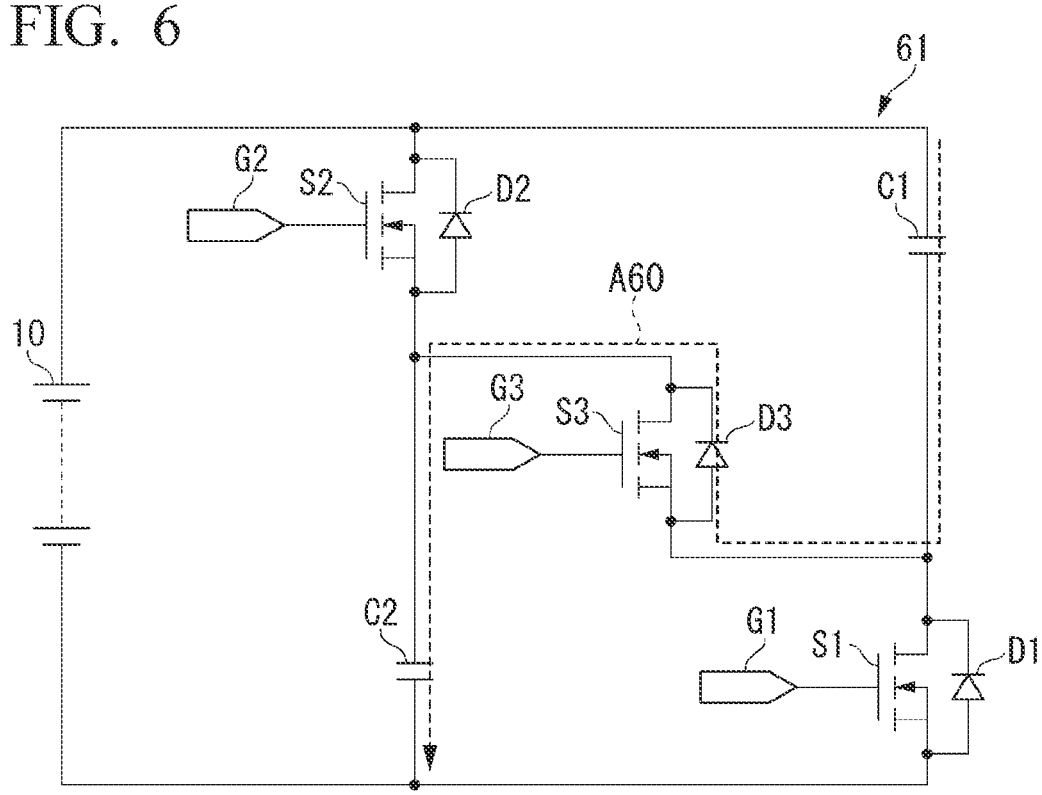
FIG. 6 is a diagram illustrating an example of a current that flows through the AC generation circuit in a second period illustrated in FIG. 4.

FIG. 6 is a diagram illustrating an example of a current that flows through the AC generation circuit in a second period illustrated in FIG. 4. In the second period T2 illustrated in FIG. 4, any of the first switch element S1, the second switch element S2, and the third switch element S3 is in a non-energized state. However, since the third diode D3 is connected to the third switch element S3, a current flows to the first capacitor C1, the third diode D3, and the second capacitor C2 as illustrated by an arrow A60 in FIG. 6. The first capacitor C1 and the second capacitor C2 are charged by this current. The second period T2 is a period from the point of time when the first switch element S1 and the second switch element S2 are in a non-energized state until the second capacitor C2 is fully charged.

Further, since the current flows to the third diode D3 during the second period T2 illustrated in FIG. 4, the potential of the source terminal of the third switch element S3 sharply rises to a potential equal to the potential of the drain terminal of the third switch element S3 as illustrated by a dotted line in FIG. 4B. Since the second capacitor C2 is charged during the second period T2 illustrated in FIG. 4, the potential of the drain terminal of the third switch element S3 rises to a potential when the second capacitor C2 is fully charged as illustrated by a solid line in FIG. 4B.

Further, since the current flows out from the drain terminal of the third switch element S3 during the second period T2 illustrated in FIG. 4, the current that flows into the drain terminal of the third switch element S3 becomes a negative current as illustrated by a solid line in FIG. 4C. Since the current does not flow to the first switch element S1 during the second period T2 illustrated in FIG. 4, the current that flows into the source terminal of the first switch element S1 is substantially 0 A as illustrated by a dotted line in FIG. 4C.

Further, since the current that flows into the third switch element S3 is substantially 0 A during the second period T2 illustrated in FIG. 4, the loss that occurs by the through-current that flows through the third switch element S3 is substantially 0 W as illustrated by a solid line in FIG. 4D.

Figure 7:
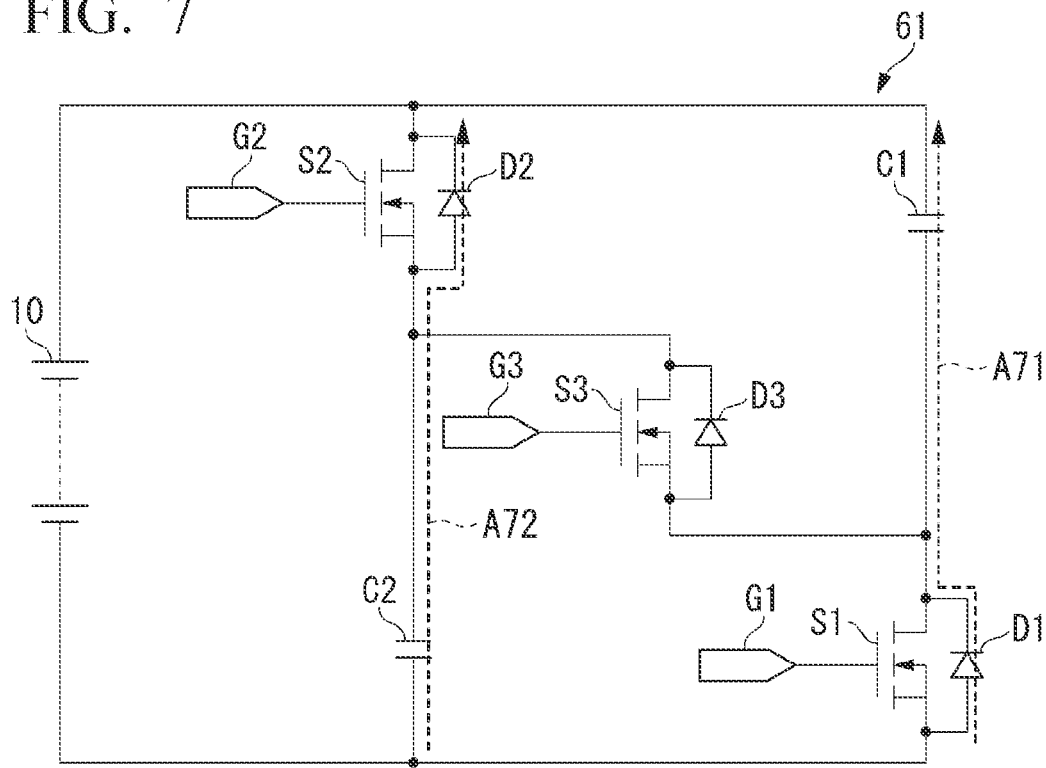
FIG. 7 is a diagram illustrating an example of a current that flows through the AC generation circuit in a third period illustrated in FIG. 4.

FIG. 7 is a diagram illustrating an example of a current that flows through the AC generation circuit in a third period illustrated in FIG. 4. In the third period T3 illustrated in FIG. 4, any of the first switch element S1, the second switch element S2, and the third switch element S3 is in a non-energized state. However, the first diode D1 is connected to the first switch element S1, and the second diode D2 is connected to the second switch element S2. Further, at the point of time when the third period T3 starts, the third diode D3 has a reverse recovery operation because the current has flowed in the forward direction until immediately before, the current flows through the second capacitor C2, the third diode D3, and the first capacitor C1 in order during the reverse recovery time, and the third diode D3 is in a non-energized state after the reverse recovery time elapses. In addition, the first capacitor C1 and the second capacitor C2 are fully charged. Therefore, when the first capacitor C1 is discharged, a current flows to the first diode D1 and the first capacitor C1 as illustrated by an arrow A71 in FIG. 7. Similarly, when the second capacitor C2 is discharged, a current flows to the second capacitor C2 and the second diode D2 as illustrated by an arrow A72 in FIG. 7.

Further, since the current does not flow to the first switch element S1 during the third period T3 illustrated in FIG. 4, the potential of the source terminal of the third switch element S3 sharply drops to the potential of 0 V of the negative electrode of the power storage body 10 as illustrated by a dotted line in FIG. 4B. Since the second capacitor C2 is discharged during the third period T3 illustrated in FIG. 4, the potential of the drain terminal of the third switch element S3 continues to decrease as illustrated by a solid line in FIG. 4B.

Further, since the current does not flow to the third switch element S3 during the third period T3 illustrated in FIG. 4, the current that flows into the drain terminal of the third switch element S3 is substantially 0 A as illustrated by a solid line in FIG. 4C. Since the current does not flow to the first switch element S1 during the third period T3 illustrated in FIG. 4, the current that flows into the source terminal of the first switch element S1 is substantially 0 A.

Further, since the current that flows into the third switch element S3 is substantially 0 A during the third period T3 illustrated in FIG. 4, the loss that occurs by the through-current that flows through the third switch element S3 is 0 W as illustrated by a solid line in FIG. 4D.

Figure 8:
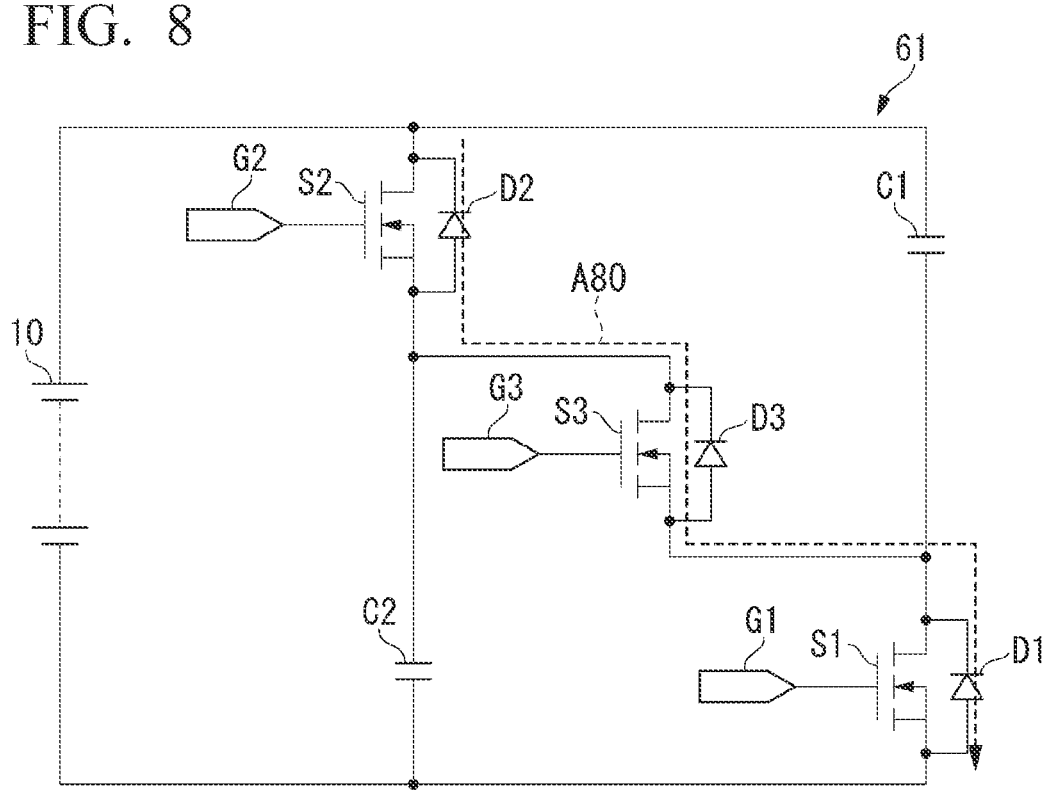
FIG. 8 is a diagram illustrating an example of a current that flows through the AC generation circuit in a fourth period illustrated in FIG. 4.

FIG. 8 is a diagram illustrating an example of a current that flows through the AC generation circuit in a fourth period illustrated in FIG. 4. In the fourth period T4 illustrated in FIG. 4, the first switch element S1 and the second switch element S2 are in a non-energized state, and the third switch element S3 is in an energized state. At the point of time when the fourth period T4 starts, the current in the forward direction is flowing to the first diode D1 and the second diode D2 until immediately before, and the third switch element S3 changes from a non-energized state to an energized state. Accordingly, a voltage in the reverse direction is applied to the first diode D1 and the second diode D2, and a reverse recovery current is generated. In other words, when the current illustrated by an arrow A71 and the current illustrated by an arrow A72 in FIG. 7 are flowing, the third switch element S3 is in an energized state. Therefore, as illustrated by an arrow A80 in FIG. 8, a current flows through the second diode D2, the third switch element S3, and the first diode D1.

Further, during the fourth period T4 illustrated in FIG. 4, the potential of the source terminal of the third switch element S3 sometimes shows a behavior of sharply decreasing and returning to a potential equal to the potential of the drain terminal of the third switch element S3 while decreasing with the potential of the drain terminal of the third switch element S3 as illustrated by a dotted line in FIG. 4B. During the fourth period T4 illustrated in FIG. 4, the potential of the drain terminal of the third switch element S3 continues to decrease to the potential equal to the potential of 0 V of the negative electrode of the power storage body 10 as illustrated by a solid line in FIG. 4B.

Further, since the current flows into the drain terminal of the third switch element S3 during the fourth period T4 illustrated in FIG. 4, the current that flows into the drain terminal of the third switch element S3 becomes a positive current as illustrated by a solid line in FIG. 4C. Since the current does not flow to the first switch element S1 during the fourth period T4 illustrated in FIG. 4, the current that flows into the source terminal of the first switch element S1 is substantially 0 A except for the time when the loss occurs in the third switch element S3.

Further, at the point of time when the fourth period T4 illustrated in FIG. 4 starts, the loss that occurs by the through-current that flows to the third switch element S3 is a value that exceeds 0 W during the reverse recovery time of the first diode D1 and the second diode D2 as illustrated by a solid line in FIG. 4D. In other words, the current flows in a direction of discharging the battery when the first switch element S1 and the second switch element S2 are in an energized state and the third switch element S3 is in a non-energized state, the first switch element S1 and the second switch element S2 are turned into a non-energized state, and during the period of the dead time when the third switch element S3 is also in a non-energized state, and the current flows in the direction of continuously discharging the battery via the third diode D3. However, due to the resonance action between the inductance of the battery and the first capacitor C1 and the second capacitor C2, the current is turned in the direction of charging the battery, and the current in the forward direction starts to flow to the first diode D1 and the second diode D2 without passing through the third diode D3. After this, when the third switch element S3 is an energized state, during the reverse recovery time of the first diode D1 and the second diode D2, a through-current flows through the second diode D2, the third diode D3, and the first diode D1, and a large loss occurs. In other words, when the length of the dead time is shorter than a predetermined value, it is possible to prevent the occurrence of a large loss.

Figure 9:
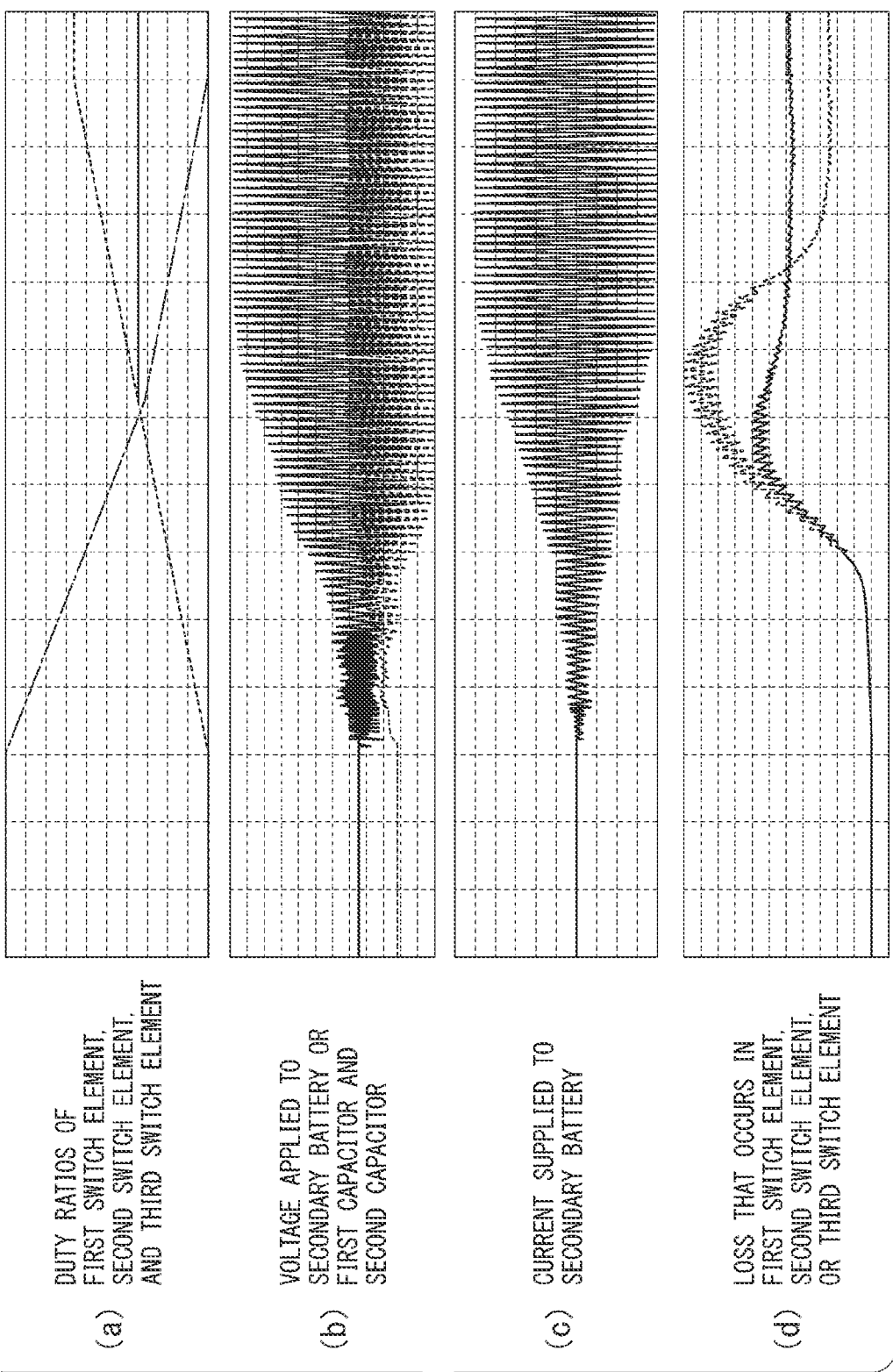
FIG. 9 is a view illustrating an example of change over time according to a comparative example of the duty ratios of the first switch element, the second switch element, and the third switch element, a voltage applied to each of the power storage body, a first capacitor, and a second capacitor when the gate signal having the duty ratio is supplied to the AC generation circuit, a current supplied to the power storage body, and the loss that occurs in each of the first switch element, the second switch element, and the third switch element.

FIG. 9 is a view illustrating an example of change over time of the duty ratios of each of the first switch element, the second switch element, and the third switch element, a voltage applied to each of the power storage body, a first capacitor, and a second capacitor when the gate signal having the duty ratio is supplied to the AC generation circuit, a current supplied to the power storage body, and the loss that occurs in each of the first switch element, the second switch element, and the third switch element.

FIG. 9A illustrates changes over time in the duty ratios of the first switch element S1, the second switch element S2, and the third switch element S3. Specifically, FIG. 9A illustrates change over time in the duty ratio of the third switch element S3 by a solid line. Further, FIG. 9A illustrates change over time in the duty ratios of the first switch element S1 and the second switch element S2 by a dotted line.

As illustrated in FIG. 9A, the switch element control unit according to the comparative example increases the duty ratio of the third switch element S3 from 0% to 33% at a constant speed. Further, as illustrated in FIG. 9A, the switch element control unit according to the comparative example increases the duty ratios of the first switch element S1 and the second switch element S2 from 0% to 66% at the same speed as that of the third switch element S3. In this comparative example, as illustrated by a one-dot chain line in FIG. 9A, the dead time decreases over time from 100% to 1%.

FIG. 9B illustrates change over time in the voltage applied to the power storage body 10 and the first capacitor C1 or the second capacitor C2 when the gate signal having the duty ratio illustrated in FIG. 9A is supplied to the AC generation circuit. Specifically, FIG. 9B illustrates change over time in the voltage applied to the power storage body 10 when the gate signal having the duty ratio illustrated in FIG. 9A is supplied to the AC generation circuit 61 by a solid line. In addition, FIG. 9B illustrates change over time in the voltage applied to the first capacitor C1 or the second capacitor C2 when the gate signal having the duty ratio illustrated in FIG. 9A is supplied to the AC generation circuit 61 by a dotted line.

As illustrated by a solid line in FIG. 9B, the amplitude of the voltage applied to the power storage body 10 increases with the increase in at least one of the duty ratios of the first switch element S1 and the second switch element S2 and the duty ratio of the third switch element S3. In addition, as illustrated by a dotted line in FIG. 9B, the amplitude of the voltage applied to the first capacitor C increases with the increase in at least one of the duty ratios of the first switch element S1 and the second switch element S2 and the duty ratio of the third switch element S3. Similarly, as illustrated by a dotted line in FIG. 9B, the amplitude of the voltage applied to the second capacitor C2 increases with the increase in at least one of the duty ratios of the first switch element S1 and the second switch element S2 and the duty ratio of the third switch element S3.

FIG. 9C illustrates the current supplied to the power storage body 10 when the gate signal having the duty ratio illustrated in FIG. 9A is supplied to the AC generation circuit 61. As illustrated in FIG. 9C, the current supplied to the power storage body 10 increases with the increase in at least one of the duty ratios of the first switch element S1 and the second switch element S2 and the duty ratio of the third switch element S3.

FIG. 9D illustrates the loss that occurs in the first switch element S1, the second switch element S2, or the third switch element S3 when the gate signal having the duty ratio illustrated in FIG. 9A is supplied to the AC generation circuit 61. Specifically, FIG. 9D illustrates the loss that occurs in the first switch element S1 or the second switch element S2 by a solid line. Further, FIG. 9D illustrates the loss that occurs in the third switch element S3 by a dotted line.

As illustrated in FIG. 9D, in any of the loss that occurs in the first switch element S1, the loss that occurs in the second switch element S2, and the loss that occurs in the third switch element S3, the amplitude of the current that flows through the power storage body 10 becomes substantially constant, and then reaches the maximum before a predetermined time elapses. Further, in the region where the length of the dead time is shorter than a predetermined value, the loss that occurs in the first switch element S1, the loss that occurs in the second switch element S2, and the loss that occurs in the third switch element S3 are stable at small values.

First Embodiment

Next, a process in which the switch element control unit 62 included in the temperature raising device 60 according to the first embodiment controls the AC generation circuit 61 will be described with reference to FIGS. 10 to 15.

Figure 10:
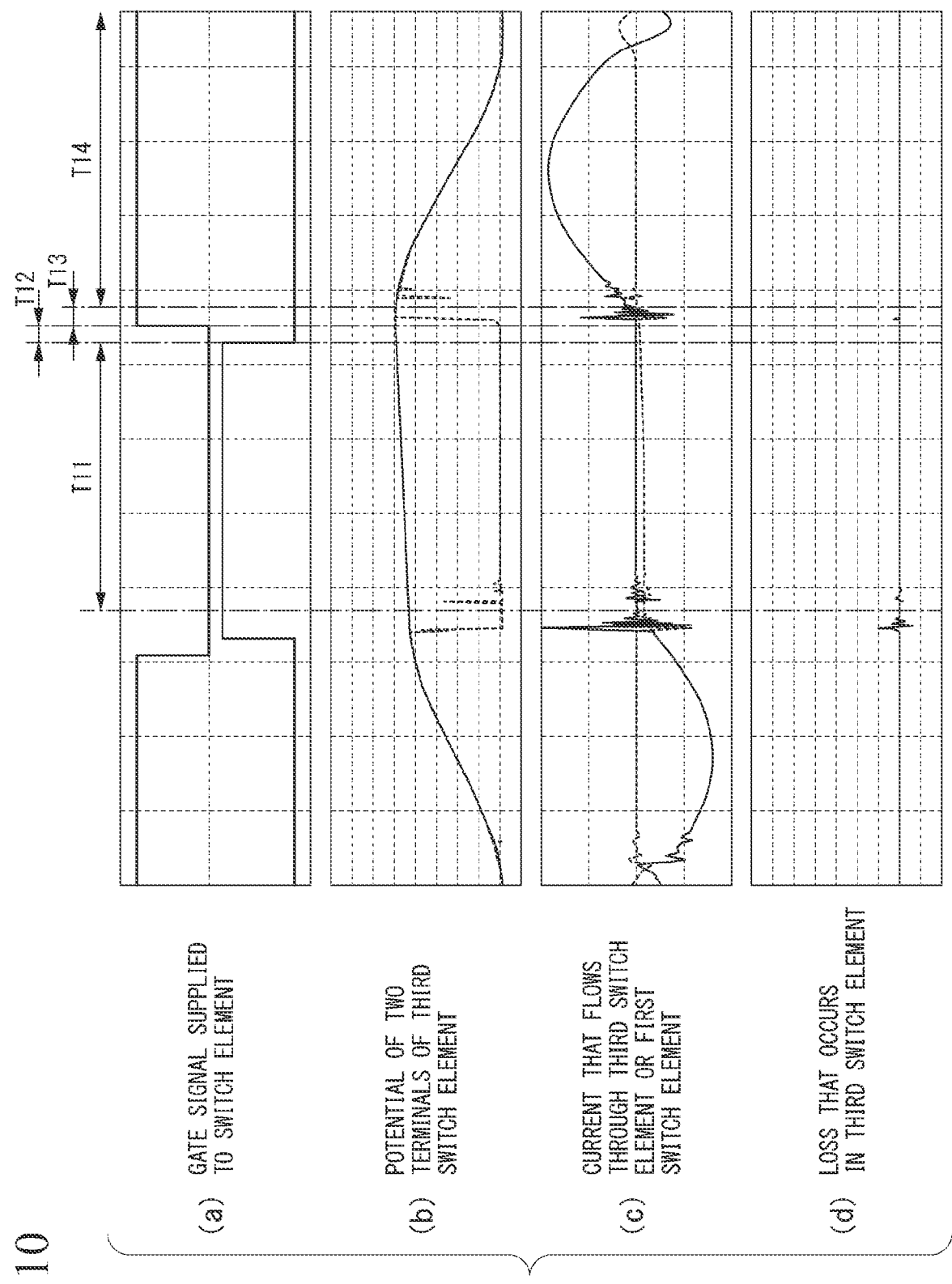
FIG. 10 is a view illustrating an example of a gate signal supplied to the three switch elements by the temperature raising device according to the first embodiment, potentials of two terminals of the third switch element when the gate signal is supplied, a current that flows through the third switch element and a current that flows through the first switch element when the gate signal is supplied, and a loss that occurs in the third switch element.

FIG. 10 is a view illustrating an example of a gate signal supplied to the three switch elements by the temperature raising device according to the first embodiment, potentials of two terminals of the third switch element when the gate signal is supplied, a current that flows through the third switch element and a current that flows through the first switch element when the gate signal is supplied, and a loss that occurs in the third switch element. Further, FIG. 10 illustrates a first period T11, a second period T12, a third period T13, and a fourth period T14.

FIG. 10A illustrates changes over time in the high or low voltage applied to the gate terminals of the first switch element S1, the second switch element S2, and the third switch element S3. Specifically, FIG. 10A illustrates the change over time in the voltage applied to the gate terminal of the third switch element S3 by a solid line in the upper row and illustrates the change over time in the voltage applied to the gate terminal of the first switch element S1 and the gate terminal of the second switch element S2 by a solid line in the lower row. The switch element control unit 62 according to the first embodiment supplies the gate signal illustrated in FIG. 10A to the gate terminals of the first switch element S1, the second switch element S2, and the third switch element S3.

FIG. 10B illustrates the change over time in the potential of the drain terminal of the third switch element S3 when the voltage illustrated in FIG. 10A is applied to each of the gate terminals of the three switch elements by a solid line. In addition, FIG. 10B illustrates the change over time in the potential of the source terminal of the third switch element S3 when the voltage illustrated in FIG. 10A is applied to each of the gate terminals of the three switch elements by a dotted line.

FIG. 10C illustrates the change over time in the current that flows into the drain terminal of the third switch element S3 when the voltage illustrated in FIG. 10A is applied to each of the gate terminals of the three switch elements by a solid line. When the current flows into the drain terminal of the third switch element S3, the current becomes a positive current, and becomes the total current of the current that flows through the third switch element S3 and the current that flows through the third diode D3. Further, FIG. 10C illustrates the change over time in the current that flows into the source terminal of the first switch element S1 when the voltage illustrated in FIG. 10A is applied to each of the gate terminals of the three switch elements by a dotted line. When the current flows into the source terminal of the first switch element S1, the current becomes a positive current, and becomes the total current of the current that flows through the first switch element S1 and the current that flows through the first diode D1.

FIG. 10D illustrates the change over time in the loss that occurs by the through-current that flows to the third switch element S3 when the voltage illustrated in FIG. 10A is applied to each of the gate terminals of the three switch elements by a solid line.

Figure 11:
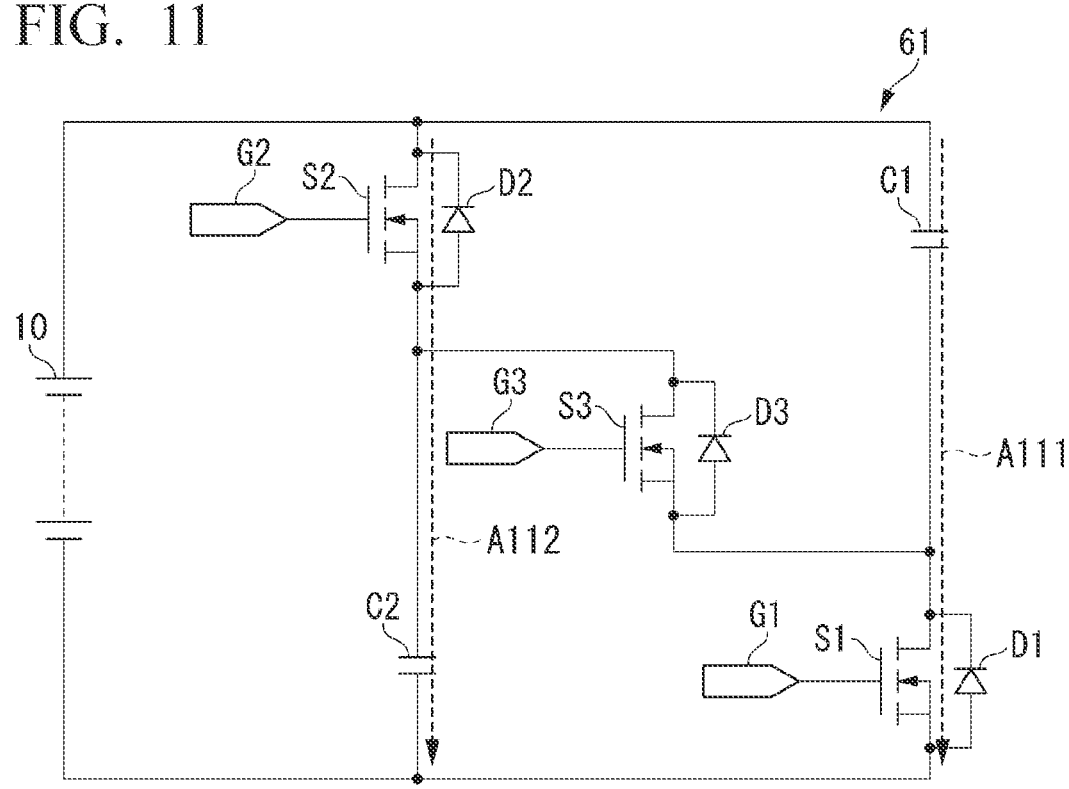
FIG. 11 is a diagram illustrating an example of a current that flows through the AC generation circuit in a first period illustrated in FIG. 10.

FIG. 11 is a diagram illustrating an example of a current that flows through the AC generation circuit in a first period illustrated in FIG. 10. In the first period T11 illustrated in FIG. 10, the first switch element S1 and the second switch element S2 are in an energized state, the third switch element S3 is in a non-energized state, and thus the first capacitor C1 and the second capacitor C2 are connected to each other in parallel. Therefore, a current flows as illustrated by arrows A111 and A112 in FIG. 11. The first capacitor C1 and the second capacitor C2 are charged by this current.

Further, since the first switch element S1 is in an energized state during the first period T11 illustrated in FIG. 10, the potential of the source terminal of the third switch element S3 is equal to the potential of 0 V of the negative electrode of the power storage body 10, as illustrated by a dotted line in FIG. 10B. During the first period T11 illustrated in FIG. 10, the second capacitor C2 continues to be charged, and the voltage applied to the second capacitor C2 continues to rise, and thus the potential of the drain terminal of the third switch element S3 continues to increase as illustrated with a solid line in FIG. 10B.

Further, since the third switch element S3 is in a non-energized state during the first period T11 illustrated in FIG. 10, the current that flows into the drain terminal of the third switch element S3 is substantially 0 A as illustrated by a solid line in FIG. 10C. Since the first switch element S1 is in an energized state during the first period T11 illustrated in FIG. 10, the current that flows into the source terminal of the first switch element S1 becomes a substantially constant and negative current as illustrated by a dotted line in FIG. 10C.

Further, since the current that flows into the third switch element S3 is substantially 0 A during the first period T11 illustrated in FIG. 10, the loss that occurs by the through-current that flows through the third switch element S3 is 0 W (watts) as illustrated by a solid line in FIG. 10D.

Figure 12:
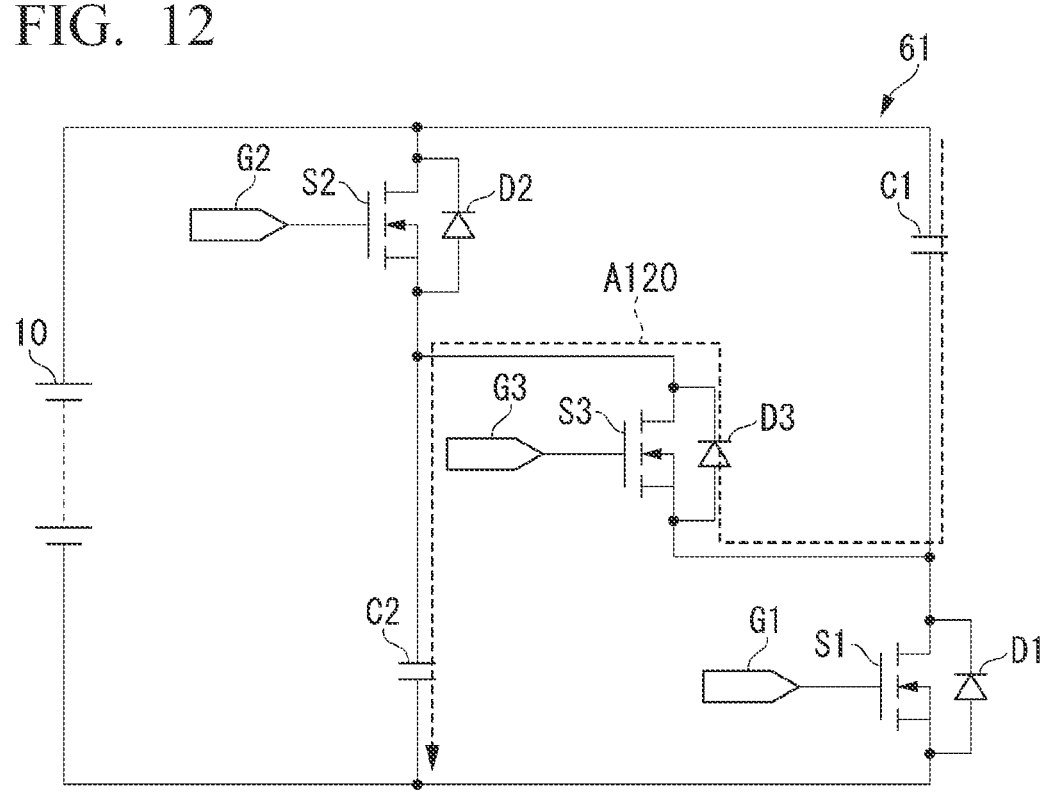
FIG. 12 is a diagram illustrating an example of a current that flows through the AC generation circuit in a second period illustrated in FIG. 10.

FIG. 12 is a diagram illustrating an example of a current that flows through the AC generation circuit in a second period illustrated in FIG. 10. In the second period T12 illustrated in FIG. 10, any of the first switch element S1, the second switch element S2, and the third switch element S3 is in a non-energized state. However, since the third diode D3 is connected to the third switch element S3, a current flows to the first capacitor C1, the third diode D3, and the second capacitor C2 as illustrated by an arrow A120 in FIG. 12. The first capacitor C1 and the second capacitor C2 are charged by this current.

Further, the second period T12 illustrated in FIG. 10 is a dead time provided between a state where the first switch element S1 and the second switch element S2 are in an energized state and the third switch element S3 is in a non-energized state, and a state where the first switch element S1 and the second switch element S2 are in a non-energized state and the third switch element S3 is in an energized state. Further, the switch element control unit 62 according to the first embodiment determines a transition time when the first switch element S1 and the second switch element S2 change from an energized state to a non-energized state, and the shortest dead time in consideration of the transition time when the third switch element S3 changes from a non-energized state to an energized state, and adjusts the length of the second period T12 so as to be a length by which the generation of a current exceeding a predetermined threshold value can be avoided.

Further, since the current flows to the third diode D3 during the second period T12 illustrated in FIG. 10, the potential of the source terminal of the third switch element S3 starts to sharply rise to a potential equal to the potential of the drain terminal of the third switch element S3 as illustrated by a dotted line in FIG. 10B. Since the second capacitor C2 is charged during the second period T12 illustrated in FIG. 10, the potential of the drain terminal of the third switch element S3 rises to a potential when the second capacitor C2 is fully charged as illustrated by a solid line in FIG. 10B.

Further, since the current flows out from the drain terminal of the third switch element S3 during the second period T12 illustrated in FIG. 10, the current that flows into the drain terminal of the third switch element S3 starts to increase as illustrated by a solid line in FIG. 10C. During the second period T12 illustrated in FIG. 10, the current that flows into the source terminal of the first switch element S1 starts to decrease as illustrated by a dotted line in FIG. 10C.

Further, since the current that flows into the third switch element S3 is substantially 0 A during the second period T12 illustrated in FIG. 10, the loss that occurs by the through-current that flows through the third switch element S3 is 0 W as illustrated by a solid line in FIG. 10D.

Figure 13:
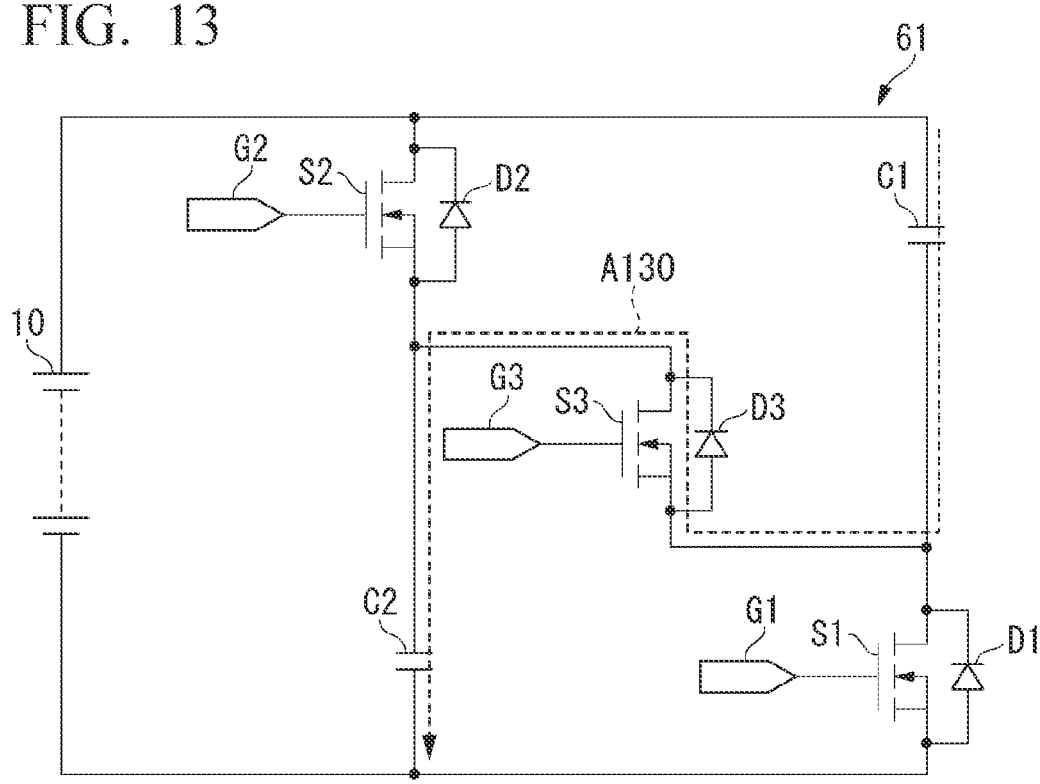
FIG. 13 is a diagram illustrating an example of a current that flows through the AC generation circuit in a third period illustrated in FIG. 10.

FIG. 13 is a diagram illustrating an example of a current that flows through the AC generation circuit in a third period illustrated in FIG. 10. In the third period T13 illustrated in FIG. 10, the first switch element S1 and the second switch element S2 are in a non-energized state following the second period T12 illustrated in FIG. 10, and the third switch element S3 is switched to an energized state. Therefore, as illustrated by an arrow A130 in FIG. 13, the current that flows to the third diode D3 during the second period T12 illustrated in FIG. 10 flows through the third switch element S3. The first capacitor C1 and the second capacitor C2 are charged by this current.

Further, since the third switch element S3 is in an energized state during the third period T13 illustrated in FIG. 10, the potential of the source terminal of the third switch element S3 rises sharply to the potential of the other terminal of the second capacitor C2, that is, the potential of the drain terminal of the third switch element S3, as illustrated by a dotted line in FIG. 10B. During the third period T13 illustrated in FIG. 10, since the second capacitor C2 continues to be charged, the potential of the drain terminal of the third switch element S3 continues to increase until the first capacitor C1 and the second capacitor C2 are fully charged as illustrated by a solid line in FIG. 10B.

Further, the current that flows into the drain terminal of the third switch element S3 during the third period T13 illustrated in FIG. 10 becomes a positive current as illustrated by a solid line in FIG. 10C. During the third period T13 illustrated in FIG. 10, the current that flows into the source terminal of the first switch element S1 becomes a negative current as illustrated by a dotted line in FIG. 10C.

Further, the loss that occurs by the through-current that flows to the third switch element S3 during the third period T13 illustrated in FIG. 10 is 0 W as illustrated by a solid line in FIG. 10D.

Figure 14:
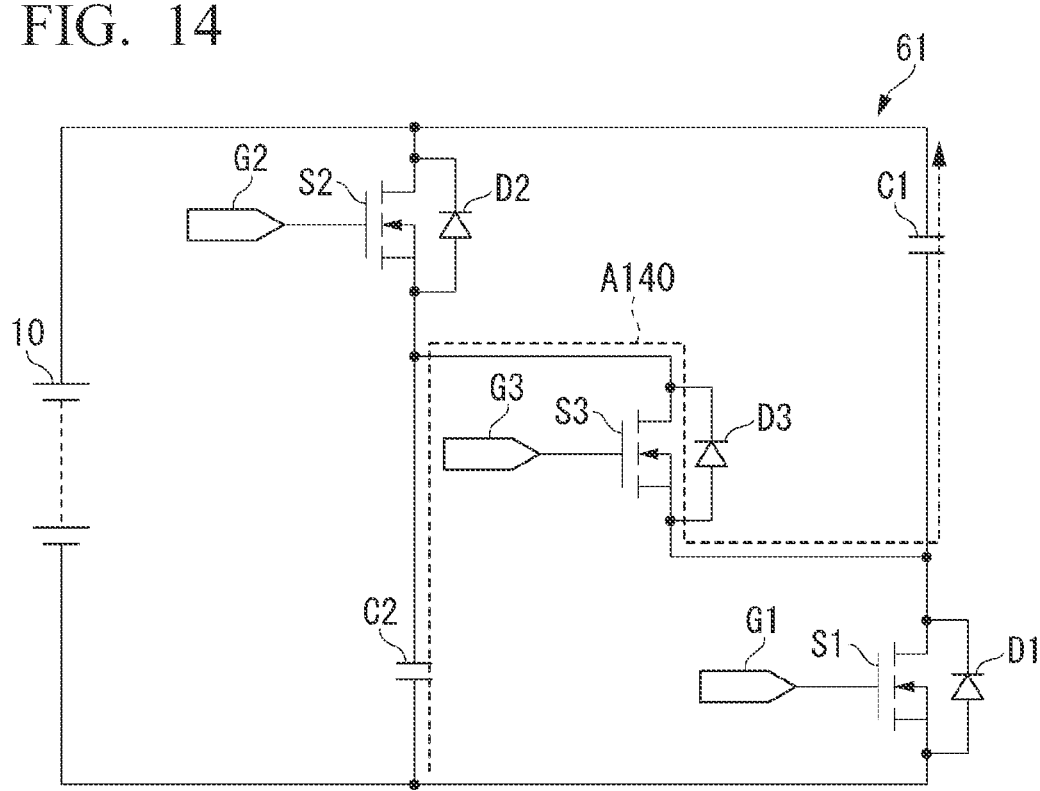
FIG. 14 is a diagram illustrating an example of a current that flows through the AC generation circuit in a fourth period illustrated in FIG. 10.

FIG. 14 is a diagram illustrating an example of a current that flows through the AC generation circuit in a fourth period illustrated in FIG. 10. In the fourth period T14 illustrated in FIG. 10, similar to the third period T13 illustrated in FIG. 10, the first switch element S1 and the second switch element S2 are in a non-energized state, and the third switch element S3 is in an energized state. Further, the first capacitor C1 and the second capacitor C2 are fully charged at the end of the third period T13 illustrated in FIG. 10. Therefore, as illustrated by an arrow A140 in FIG. 14, a current flows to the second capacitor C2, the third switch element S3, and the first capacitor C1. Further, this current flows by discharging the first capacitor C1 and the second capacitor C2.

Further, since the third switch element S3 is in an energized state during the fourth period T14 illustrated in FIG. 10, the potential of the source terminal of the third switch element S3 rises sharply to the potential of the other terminal of the second capacitor C2, that is, the potential of the drain terminal of the third switch element S3, as illustrated by a dotted line in FIG. 10B. Since the second capacitor C2 is discharged during the fourth period T14 illustrated in FIG. 10, the potential of the drain terminal of the third switch element S3 continues to decrease to the potential equal to the potential of 0 V of the negative electrode of the power storage body 10 as illustrated by a solid line in FIG. 10B.

Further, since the current flows into the drain terminal of the third switch element S3 during the fourth period T14 illustrated in FIG. 10, the current that flows into the drain terminal of the third switch element S3 becomes a positive current as illustrated by a solid line in FIG. 10C. Since the current does not flow to the first switch element S1 during the fourth period T14 illustrated in FIG. 10, the current that flows into the source terminal of the first switch element S1 is substantially 0 A.

Further, the fourth period T14 illustrated in FIG. 10 does not become the reverse recovery time of the first diode D1 and the second diode D2. Therefore, the loss that occurs by the through-current that flows to the third switch element S3 is 0 W as illustrated by a solid line in FIG. 10D.

Figure 15:
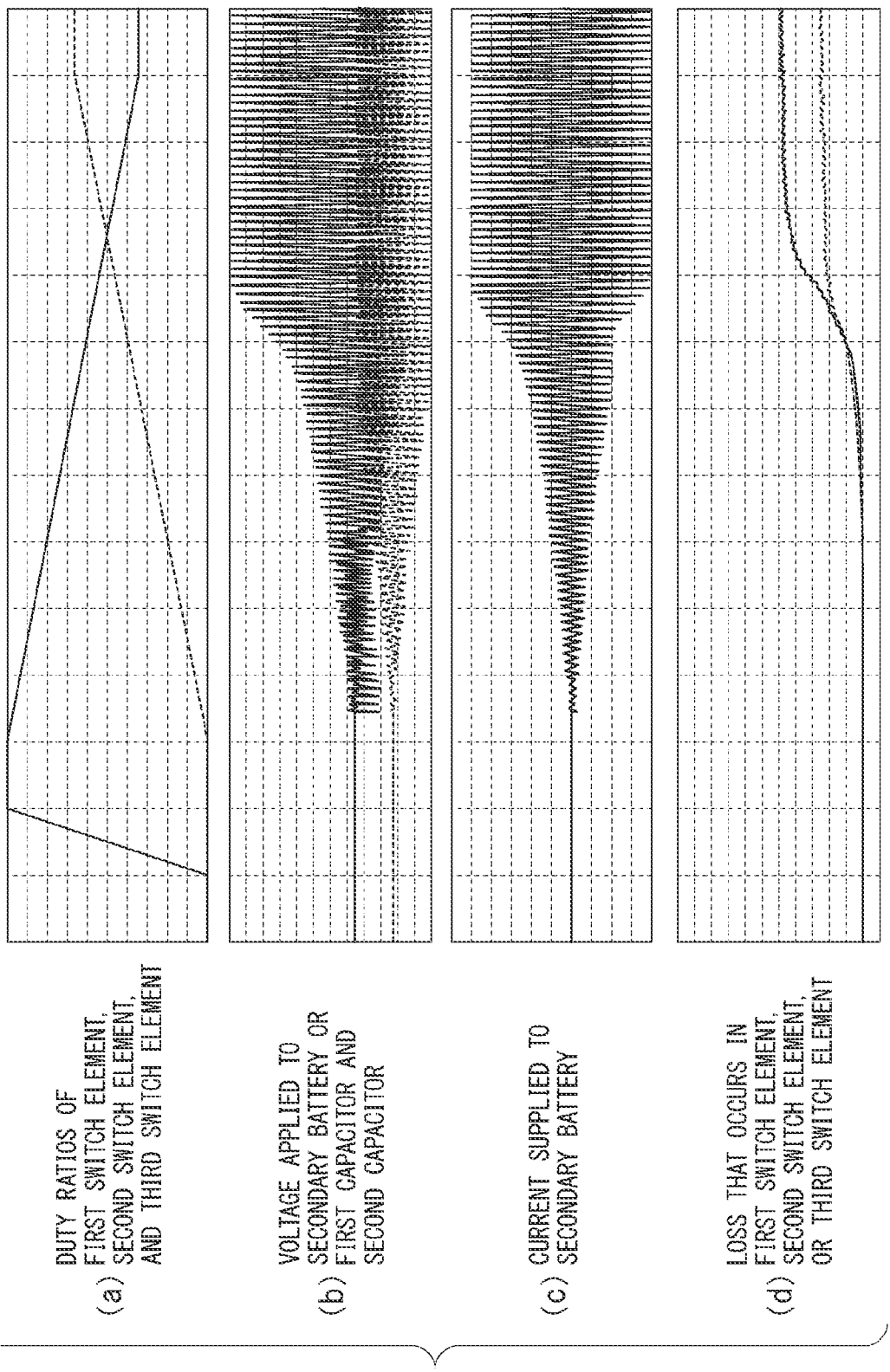
FIG. 15 is a view illustrating an example of change over time according to the first embodiment of the duty ratios of the first switch element, the second switch element, and the third switch element, a voltage applied to each of the power storage body, the first capacitor, and the second capacitor when the gate signal having the duty ratio is supplied to the AC generation circuit, a current supplied to the power storage body, and the loss that occurs in each of the first switch element, the second switch element, and the third switch element.

FIG. 15 is a view illustrating an example of the voltage applied to each of the power storage body, the first capacitor, and the second capacitor when the gate signal illustrated in FIG. 10 is supplied to the AC generation circuit, the duty ratios of each of the first switch element, the second switch element, and the third switch element, the current supplied to the power storage body, and the loss that occurs in each of the first switch element, the second switch element, and the third switch element.

FIG. 15A illustrates changes over time in the duty ratios of the first switch element S1, the second switch element S2, and the third switch element S3. Specifically, FIG. 15A illustrates change over time in the duty ratio of the third switch element S3 by a solid line. Further, FIG. 15A illustrates change over time in the duty ratios of the first switch element S1 and the second switch element S2 by a dotted line.

As illustrated by a dotted line in FIG. 15A, the switch element control unit 62 according to the first embodiment executes a process of increasing the duty ratios of the first switch element S1 and the second switch element S2 from 0% to 66%. This process is an example of a process of increasing the duty ratio of the first switch element S1 and the duty ratio of the second switch element S2 from 0% from the initial state where the first switch element S1, the second switch element S2, and the third switch element S3 are in a non-energized state.

Further, as illustrated by a solid line in FIG. 15A, the switch element control unit 62 according to the first embodiment executes a process of increasing the duty ratio of the third switch element S3 from 0% to 100% at a constant speed.

Then, as illustrated by a solid line in FIG. 15A, the switch element control unit 62 according to the first embodiment executes a process of decreasing the duty ratio of the third switch element S3 from 100% to 33% at the same speed as that of the speed of increasing the duty ratios of the first switch element S1 and the second switch element S2. As illustrated in FIG. 15A, this process is started at the same time as the start of the process of increasing the duty ratios of the first switch element S1 and the second switch element S2 from 0% to 66% at the same speed as that of the third switch element S3. Further, this process is an example of a process of decreasing the duty ratio of the third switch element S3 from 100% by the increased amount of the duty ratio of the first switch element S1 and the duty ratio of the second switch element S2 from the initial state where the first switch element S1, the second switch element S2, and the third switch element S3 are in a non-energized state.

FIG. 15B illustrates change over time in the voltage applied to the power storage body 10 and the first capacitor C1 or the second capacitor C2 when the gate signal having the duty ratio illustrated in FIG. 15A is supplied to the AC generation circuit 61. Specifically, FIG. 15B illustrates change over time in the voltage applied to the power storage body 10 when the gate signal having the duty ratio illustrated in FIG. 15A is supplied to the AC generation circuit 61 by a solid line. In addition, FIG. 15B illustrates change over time in the voltage applied to the first capacitor C1 or the second capacitor C2 when the gate signal having the duty ratio illustrated in FIG. 15A is supplied to the AC generation circuit 61 by a dotted line.

As illustrated by a solid line in FIG. 15B, the amplitude of the voltage applied to the power storage body 10 increases with the increase in the duty ratios of the first switch element S1 and the second switch element S2 and the decrease in the duty ratio of the third switch element S3. In addition, as illustrated by a dotted line in FIG. 15B, the amplitude of the voltage applied to the first capacitor C1 increases with the increase in the duty ratios of the first switch element S1 and the second switch element S2 and the decrease in the duty ratio of the third switch element S3. Similarly, as illustrated by a dotted line in FIG. 15B, the amplitude of the voltage applied to the second capacitor C2 increases with the increase in the duty ratios of the first switch element S1 and the second switch element S2 and the decrease in the duty ratio of the third switch element S3.

FIG. 15C illustrates the current supplied to the power storage body 10 when the gate signal having the duty ratio illustrated in FIG. 15A is supplied to the AC generation circuit 61. As illustrated in FIG. 15C, the current supplied to the power storage body 10 increases with the increase in the duty ratios of the first switch element S1 and the second switch element S2 and the decrease in the duty ratio of the third switch element S3.

FIG. 15D illustrates the loss that occurs in the first switch element S1, the second switch element S2, or the third switch element S3 when the gate signal having the duty ratio illustrated in FIG. 15A is supplied to the AC generation circuit 61. Specifically, FIG. 15D illustrates the loss that occurs in the first switch element S1 or the second switch element S2 by a solid line. Further, FIG. 15D illustrates the loss that occurs in the third switch element S3 by a dotted line.

As illustrated by a dotted line in FIG. 15D, the loss that occurs in the third switch element S3 increases as the amplitude of the current that flows through the power storage body 10 becomes substantially constant and becomes substantially constant after a predetermined time elapses after the amplitude of the current becomes substantially constant. Further, unlike the loss that occurs in the third switch element S3 in the case of the comparative example, the loss that occurs in the third switch element S3 does not reach the maximum during the increase. Furthermore, as illustrated by a solid line in FIG. 15D, the same applies to the loss that occurs in the first switch element S1 and the loss that occurs in the second switch element S2.

Second Embodiment

Next, a process in which the switch element control unit 62 included in the temperature raising device 60 according to the second embodiment controls the AC generation circuit 61 will be described with reference to FIGS. 16 to 25.

Figure 16:
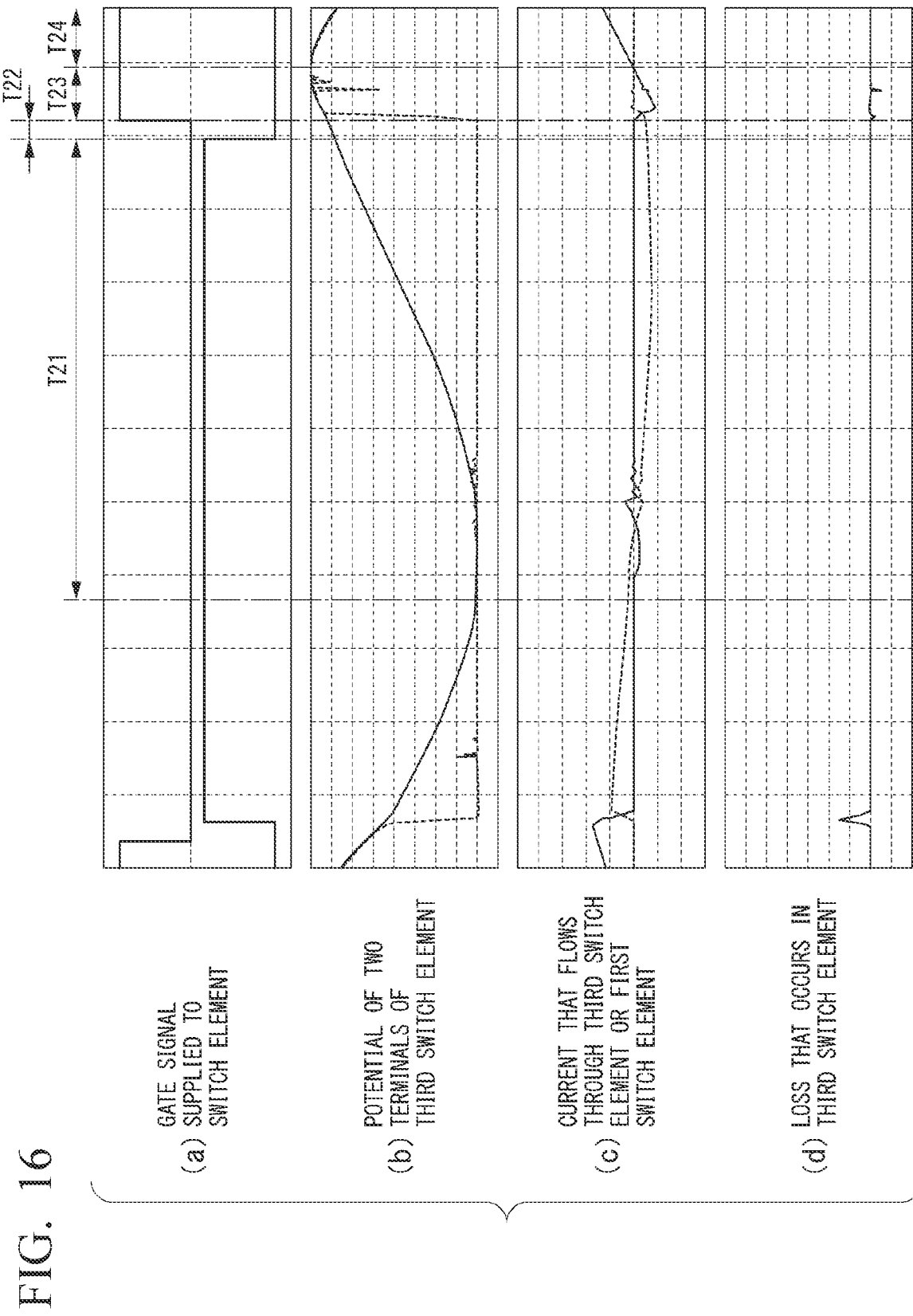
FIG. 16 is a view illustrating an example of a gate signal supplied to the three switch elements by the temperature raising device according to the second embodiment, potentials of two terminals of the third switch element when the gate signal is supplied, a current that flows through the third switch element and a current that flows through the first switch element when the gate signal is supplied, and a loss that occurs in the third switch element.

FIG. 16 is a view illustrating an example of a gate signal supplied to the three switch elements by the temperature raising device according to the second embodiment, potentials of two terminals of the third switch element when the gate signal is supplied, a current that flows through the third switch element and a current that flows through the first switch element when the gate signal is supplied, and a loss that occurs in the third switch element. Further, FIG. 16 illustrates a first period T21, a second period T22, a third period T23, and a fourth period T24.

Figure 17:
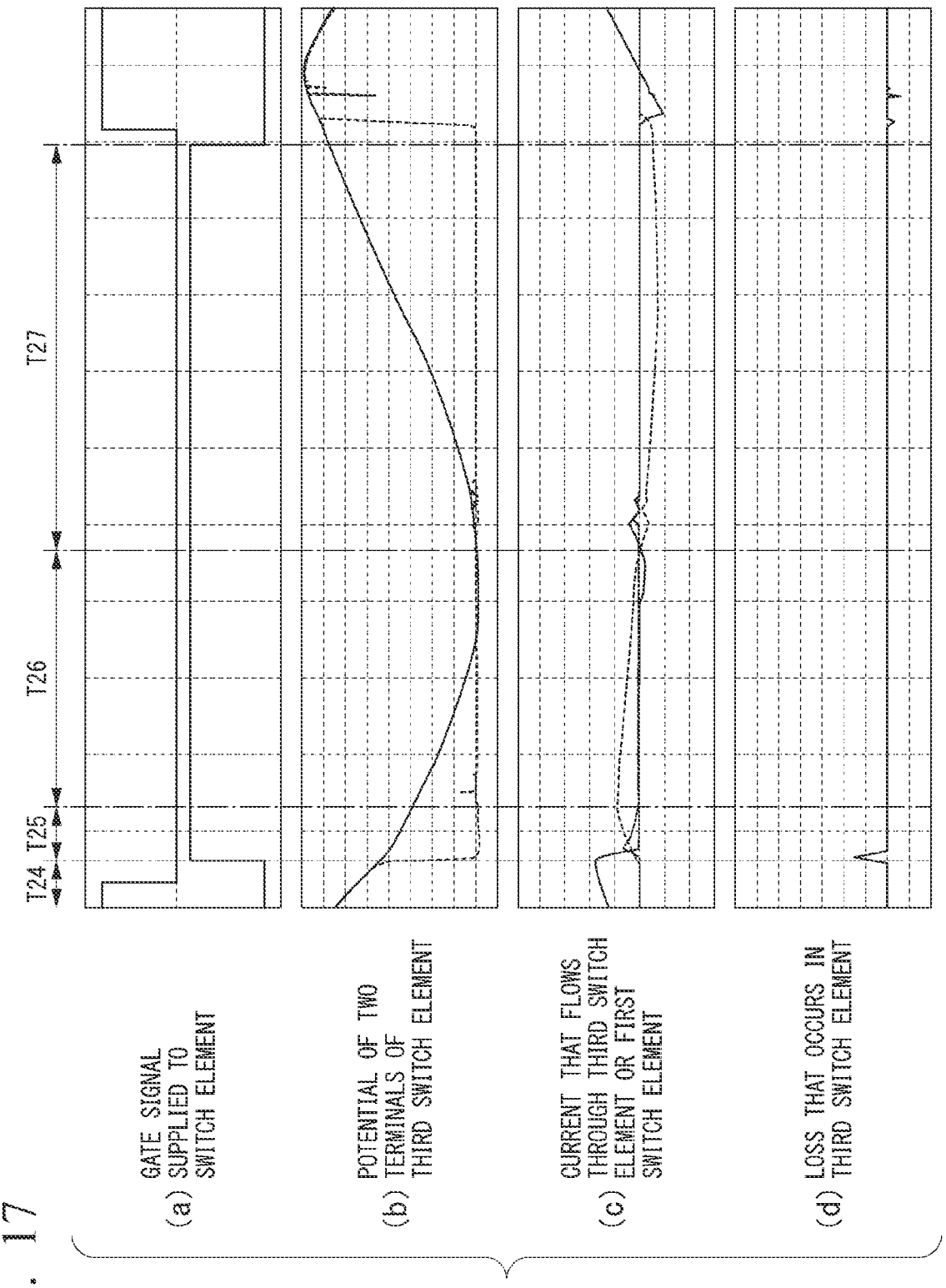
FIG. 17 is a view illustrating an example of a gate signal supplied to the three switch elements by the temperature raising device according to the second embodiment, potentials of two terminals of the third switch element when the gate signal is supplied, a current that flows through the third switch element when the gate signal is supplied, a current that flows through the first switch element, and a loss that occurs in the third switch element.

FIG. 17 is a view illustrating an example of a gate signal supplied to the three switch elements by the temperature raising device according to the second embodiment, potentials of two terminals of the third switch element when the gate signal is supplied, a current that flows through the third switch element when the gate signal is supplied, a current that flows through the first switch element, and a loss that occurs in the third switch element. Further, FIG. 17 illustrates the fourth period T24, a fifth period T25, a sixth period T26, and a seventh period T27.

FIGS. 16A and 17A illustrate changes over time in the high or low voltage applied to the gate terminals of the first switch element S1, the second switch element S2, and the third switch element S3. Specifically, FIGS. 16A and 17A illustrate the changes over time in the voltage applied to the gate terminal of the third switch element S3 by a solid line in the upper row, and illustrates the change over time in the voltage applied to the gate terminal of the first switch element S1 and the gate terminal of the second switch element S2 by a solid line in the lower row. The switch element control unit 62 according to the second embodiment supplies the gate signal illustrated in FIGS. 16A and 17A to the gate terminals of the first switch element S1, the second switch element S2, and the third switch element S3.

FIGS. 16B and 17B illustrate the changes over time in the potential of the drain terminal of the third switch element S3 when the voltage illustrated in FIGS. 16A and 17B is applied to each of the gate terminals of the three switch elements by a solid line. In addition, FIGS. 16B and 17B illustrate the changes over time in the potential of the source terminal of the third switch element S3 when the voltage illustrated in FIGS. 16A and 17B is applied to each of the gate terminals of the three switch elements by a dotted line.

FIGS. 16C and 17C illustrate the changes over time in the current that flows into the drain terminal of the third switch element S3 when the voltage illustrated in FIGS. 16A and 17A is applied to each of the gate terminals of the three switch elements by a solid line. When the current flows into the drain terminal of the third switch element S3, the current becomes a positive current, and becomes the total current of the current that flows through the third switch element S3 and the current that flows through the third diode D3. In addition, FIGS. 16C and 17C illustrate the changes over time in the current that flows into the source terminal of the first switch element S1 when the voltage illustrated in FIGS. 16A and 17A is applied to each of the gate terminals of the three switch elements by a dotted line. When the current flows into the source terminal of the first switch element S1, the current becomes a positive current, and becomes the total current of the current that flows through the first switch element S1 and the current that flows through the first diode D1. Further, FIG. 17C illustrates change over time in the current that flows in the forward direction to the first diode D1 when the voltage illustrated in FIG. 17A is applied to each of the gate terminals of the three switch elements by a one-dot chain line.

FIGS. 16D and 17D illustrate the change over time in the loss that occurs by the through-current that flows to the third switch element S3 when the voltage illustrated in FIGS. 16A and 17D is applied to each of the gate terminals of the three switch elements by a solid line.

Figure 18:
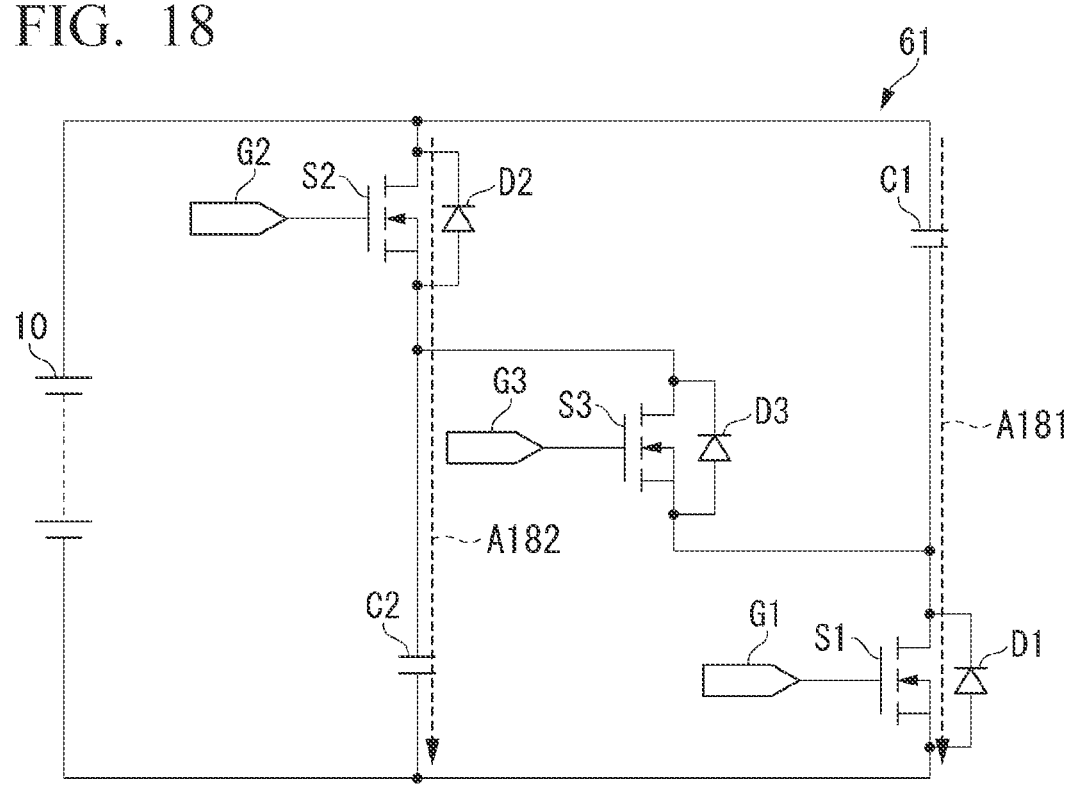
FIG. 18 is a diagram illustrating an example of a current that flows through the AC generation circuit in a first period illustrated in FIG. 16.

FIG. 18 is a diagram illustrating an example of a current that flows through the AC generation circuit in a first period illustrated in FIG. 16. In the first period T21 illustrated in FIG. 16, the first switch element S1 and the second switch element S2 are in an energized state, the third switch element S3 is in a non-energized state, and thus the first capacitor C1 and the second capacitor C2 are connected to each other in parallel. Therefore, the current flows as illustrated by arrows A181 and A182 in FIG. 18. The first capacitor C1 and the second capacitor C2 are charged by this current.

Further, since the first switch element S1 is in an energized state during the first period T21 illustrated in FIG. 16, the potential of the source terminal of the third switch element S3 is equal to the potential of 0 V of the negative electrode of the power storage body 10, as illustrated by a dotted line in FIG. 16B. During the first period T21 illustrated in FIG. 16, the second capacitor C2 continues to be charged, and the voltage applied to the second capacitor C2 continues to rise, and thus the potential of the drain terminal of the third switch element S3 continues to increase as illustrated with a solid line in FIG. 16B.

Further, since the third switch element S3 is in a non-energized state during the first period T21 illustrated in FIG. 16, the current that flows into the drain terminal of the third switch element S3 is substantially 0 A as illustrated by a solid line in FIG. 16C. Since the first switch element S1 is in an energized state during the first period T21 illustrated in FIG. 16, and the current flows out of the source terminal of the first switch element S1, the current that flows into the source terminal of the first switch element S1 becomes a substantially constant and negative current as illustrated by a dotted line in FIG. 16C.

Further, since the current that flows into the third switch element S3 is substantially 0 A during the first period T21 illustrated in FIG. 16, the loss that occurs by the through-current that flows through the third switch element S3 is 0 W (watt) as illustrated by a solid line in FIG. 16D.

Figure 19:
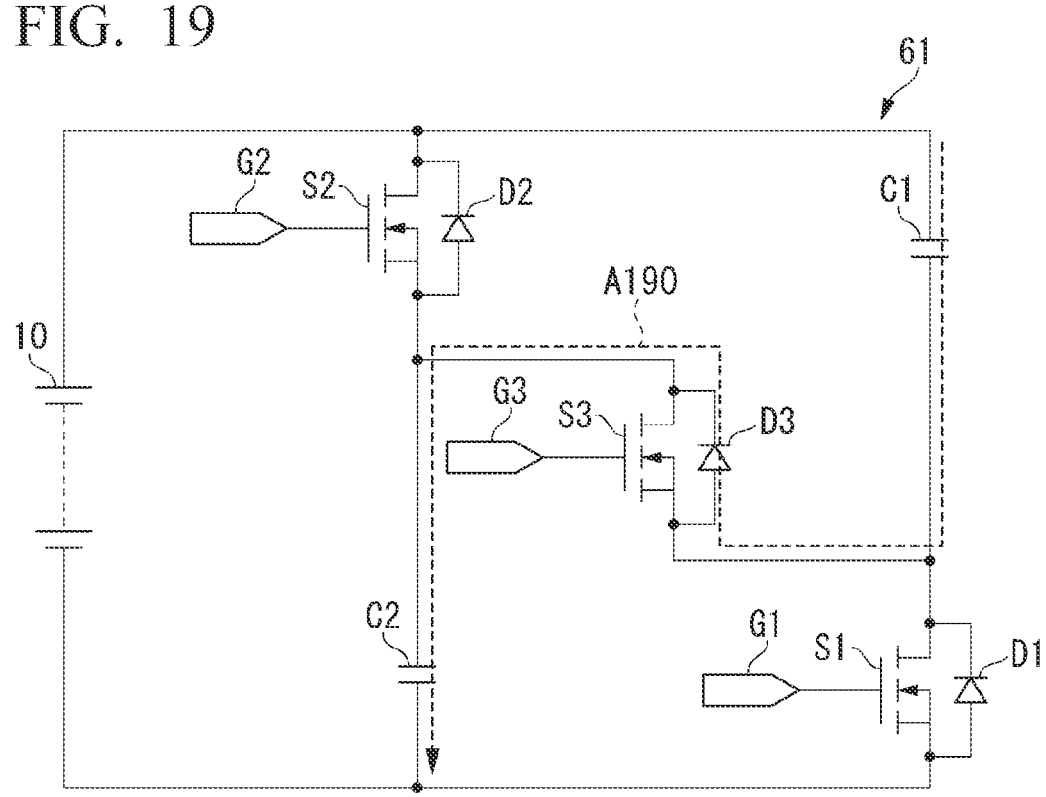
FIG. 19 is a diagram illustrating an example of a current that flows through the AC generation circuit in a second period illustrated in FIG. 16.

FIG. 19 is a diagram illustrating an example of a current that flows through the AC generation circuit in a second period illustrated in FIG. 16. In the second period T22 illustrated in FIG. 16, any of the first switch element S1, the second switch element S2, and the third switch element S3 is in a non-energized state. However, since the third diode D3 is connected to the third switch element S3, a current flows to the first capacitor C1, the third diode D3, and the second capacitor C2 as illustrated by an arrow A190 in FIG. 19. The first capacitor C1 and the second capacitor C2 are charged by this current.

Further, the second period T22 illustrated in FIG. 16 is a dead time provided between a state where the first switch element S1 and the second switch element S2 are in an energized state and the third switch element S3 is in a non-energized state, and a state where the first switch element S1 and the second switch element S2 are in a non-energized state and the third switch element S3 is in an energized state. Further, the switch element control unit 62 according to the second embodiment determines a transition time when the first switch element S1 and the second switch element S2 change from an energized state to a non-energized state, and the shortest dead time in consideration of the transition time when the third switch element S3 changes from a non-energized state to an energized state, and adjusts the length of the second period T22 so as to be a length by which generation of a current exceeding a predetermined threshold value can be avoided.

Further, since the current flows to the third diode D3 during the second period T22 illustrated in FIG. 16, the potential of the source terminal of the third switch element S3 starts to sharply rise to a potential equal to the potential of the drain terminal of the third switch element S3 as illustrated by a dotted line in FIG. 16B. Since the second capacitor C2 is charged during the second period T22 illustrated in FIG. 16, the potential of the drain terminal of the third switch element S3 rises to a potential when the second capacitor C2 is fully charged as illustrated by a solid line in FIG. 16B.

Further, since the current flows out from the drain terminal of the third switch element S3 during the second period T22 illustrated in FIG. 16, the current that flows into the drain terminal of the third switch element S3 starts to decrease as illustrated by a solid line in FIG. 16C. During the second period T22 illustrated in FIG. 16, the current that flows into the source terminal of the first switch element S1 starts to increase as illustrated by a dotted line in FIG. 16C.

Further, since the current that flows into the third switch element S3 is substantially 0 A during the second period T22 illustrated in FIG. 16, the loss that occurs by the through-current that flows through the third switch element S3 is 0 W as illustrated by a solid line in FIG. 16D.

Figure 20:
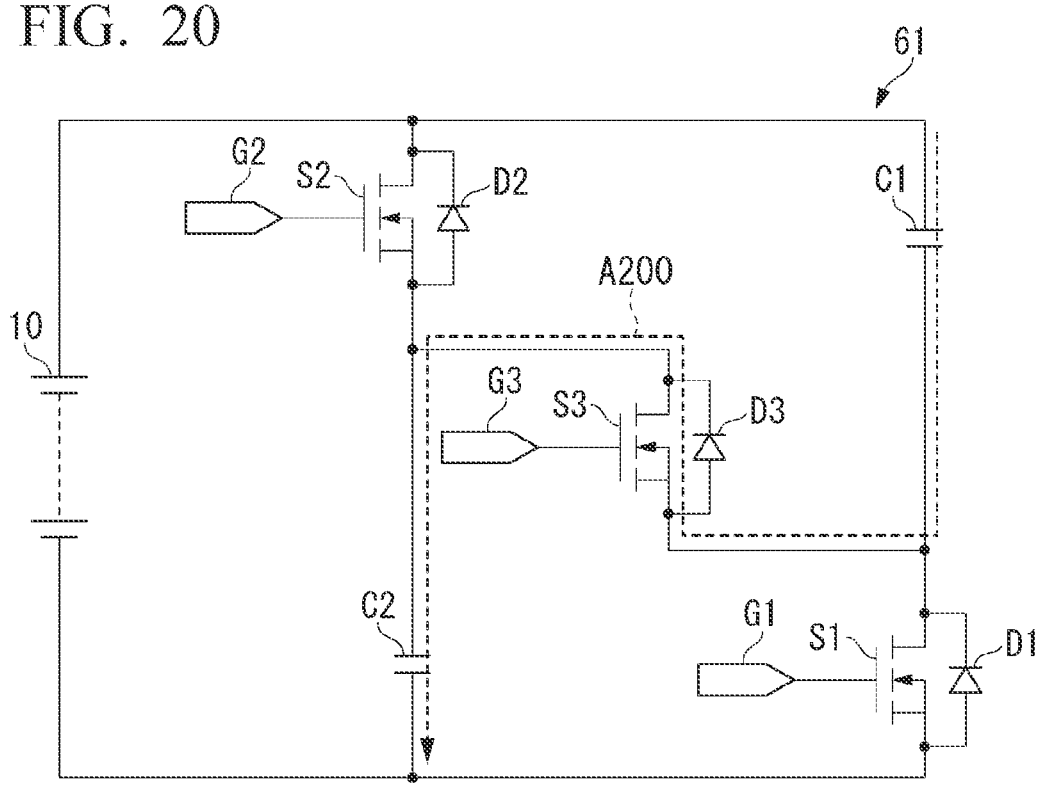
FIG. 20 is a diagram illustrating an example of a current that flows through the AC generation circuit in a third period illustrated in FIG. 16.

FIG. 20 is a diagram illustrating an example of a current that flows through the AC generation circuit in a third period illustrated in FIG. 16. In the third period T23 illustrated in FIG. 16, the first switch element S1 and the second switch element S2 are in a non-energized state following the second period T22 illustrated in FIG. 16, and the third switch element S3 is switched to an energized state. Therefore, as illustrated by an arrow A200 in FIG. 20, the current that flows to the third diode D3 during the second period T22 illustrated in FIG. 16 flows through the third switch element S3. The first capacitor C1 and the second capacitor C2 are charged by this current.

Further, since the third switch element S3 is in an energized state during the third period T23 illustrated in FIG. 16, the potential of the source terminal of the third switch element S3 rises sharply to the potential of the other terminal of the second capacitor C2, that is, the potential of the drain terminal of the third switch element S3, as illustrated by a dotted line in FIG. 16B. During the third period T23 illustrated in FIG. 16, since the second capacitor C2 continues to be charged, the potential of the drain terminal of the third switch element S3 continues to increase until the first capacitor C1 and the second capacitor C2 are fully charged as illustrated by a solid line in FIG. 16B.

Further, the current that flows into the drain terminal of the third switch element S3 during the third period T23 illustrated in FIG. 16 becomes a negative current as illustrated by a solid line in FIG. 16C. During the third period T23 illustrated in FIG. 16, the current that flows into the source terminal of the first switch element S1 becomes a positive current as illustrated by a dotted line in FIG. 16C.

Further, the loss that occurs by the through-current that flows to the third switch element S3 during the third period T23 illustrated in FIG. 16 is 0 W as illustrated by a solid line in FIG. 16D.

Figure 21:
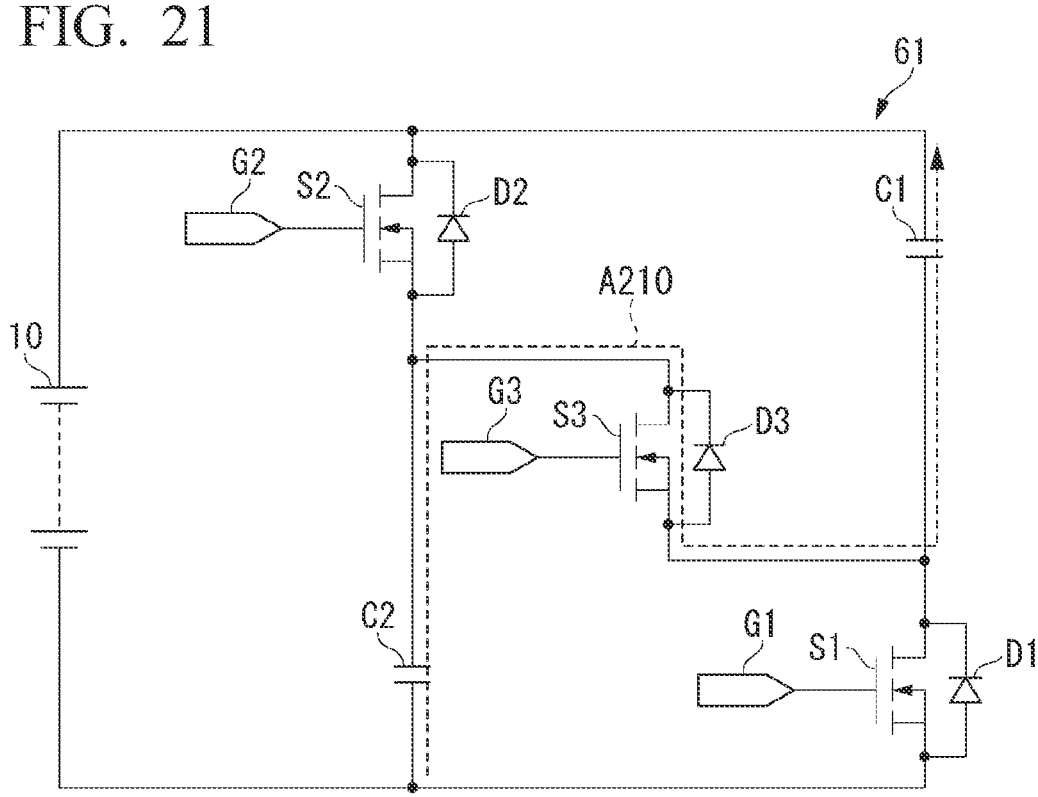
FIG. 21 is a diagram illustrating an example of a current that flows through the AC generation circuit in a fourth period illustrated in FIG. 16.

FIG. 21 is a diagram illustrating an example of a current that flows through the AC generation circuit in a fourth period illustrated in FIG. 16. In the fourth period T24 illustrated in FIGS. 16 and 17, similar to the third period T3 illustrated in FIG. 16, the first switch element S1 and the second switch element S2 are in a non-energized state, and the third switch element S3 is in an energized state. Further, the first capacitor C1 and the second capacitor C2 are fully charged at the end of the third period T23 illustrated in FIG. 16. Therefore, as illustrated by an arrow A210 in FIG. 21, a current flows to the second capacitor C2, the third switch element S3, and the first capacitor C1. Further, this current flows by discharging the first capacitor C1 and the second capacitor C2.

Further, since the third switch element S3 is in an energized state during the fourth period T24 illustrated in FIGS. 16 and 17, the potential of the source terminal of the third switch element S3 substantially coincides with the potential of the other terminal of the second capacitor C2, that is, the potential of the drain terminal of the third switch element S3, as illustrated by a dotted line in FIGS. 16B and 17B. Since the second capacitor C2 is discharged during the fourth period T24 illustrated in FIGS. 16 and 17, the potential of the drain terminal of the third switch element S3 decreases as illustrated by solid lines in FIGS. 16B and 17B.

Further, since the current flows into the drain terminal of the third switch element S3 during the fourth period T24 illustrated in FIGS. 16 and 17, the current that flows into the drain terminal of the third switch element S3 becomes a positive current as illustrated by a solid line in FIGS. 16C and 17C. Since the current does not flow to the first switch element S1 during the fourth period T24 illustrated in FIGS. 16 and 17, the current that flows into the source terminal of the first switch element S1 is substantially 0 A.

Further, the fourth period T24 illustrated in FIGS. 16 and 17 does not become the reverse recovery time of the first diode D1 and the second diode D2. Therefore, the loss that occurs by the through-current that flows to the third switch element S3 is 0 W as illustrated by a solid line in FIGS. 16D and 17D.

Figure 22:
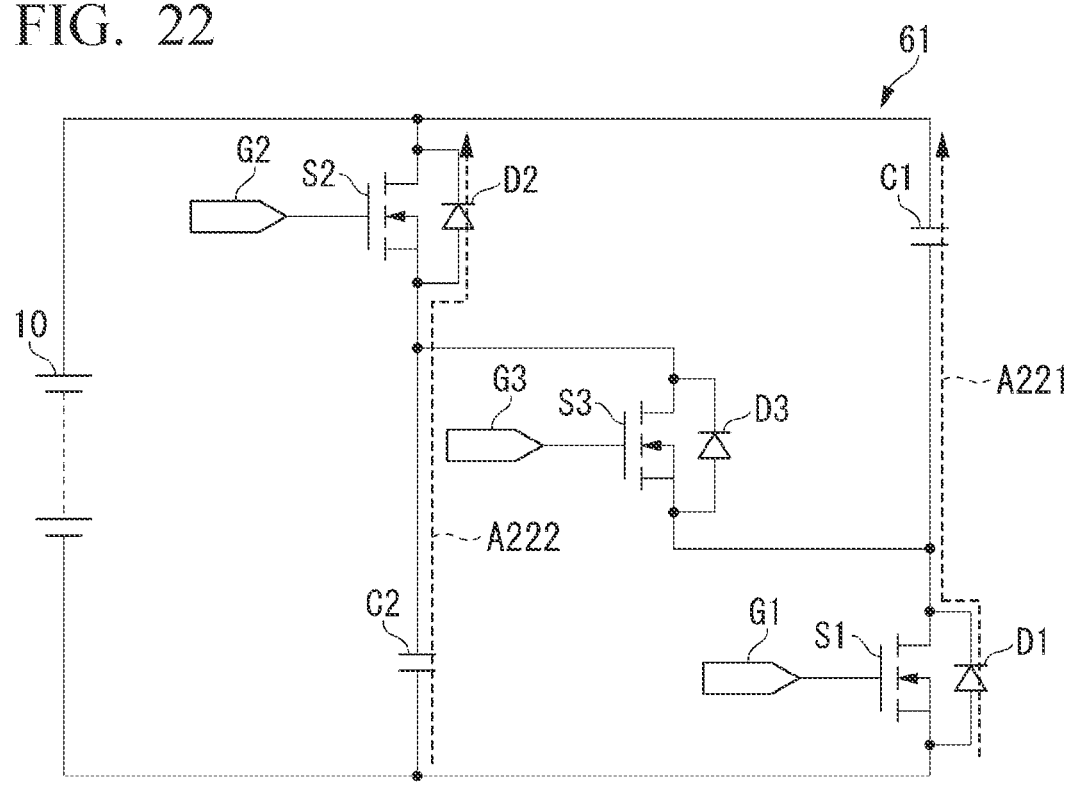
FIG. 22 is a diagram illustrating an example of a current that flows through the AC generation circuit in a fifth period illustrated in FIG. 17.

FIG. 22 is a diagram illustrating an example of a current that flows through the AC generation circuit in a fifth period illustrated in FIG. 17. In the fifth period T25 illustrated in FIG. 17, the first switch element S1 and the second switch element S2 are switched to an energized state, and the third switch element S3 is in a non-energized state following the fourth period T24. However, the first diode D1 is connected to the first switch element S1, and the second diode D2 is connected to the second switch element S2. Further, when the fifth period T25 is started, the first capacitor C1 and the second capacitor C2 continue to discharge. Therefore, when the first capacitor C1 is discharged, a current flows to the first diode D1 and the first capacitor C1 as illustrated by an arrow A221 in FIG. 22. Similarly, when the second capacitor C2 is discharged, a current flows to the second capacitor C2 and the second diode D2 as illustrated by an arrow A222 in FIG. 22.

Further, since the current does not flow to the first switch element S1 during the fifth period T25 illustrated in FIG. 17, the potential of the source terminal of the third switch element S3 sharply drops to the potential of 0 V of the negative electrode of the power storage body 10 as illustrated by a dotted line in FIG. 17B. Since the second capacitor C2 is discharged during the fifth period T25 illustrated in FIG. 17, the potential of the drain terminal of the third switch element S3 continues to decrease as illustrated by a solid line in FIG. 17B.

Further, since the current does not flow to the third switch element S3 during the fifth period T25 illustrated in FIG. 17, the current that flows into the drain terminal of the third switch element S3 is substantially 0 A as illustrated by a solid line in FIG. 17C. Since the current does not flow to the first switch element S1 during the fifth period T25 illustrated in FIG. 17, the current that flows into the source terminal of the first switch element S1 is substantially 0 A as illustrated by a dotted line in FIG. 17C. The current that flows in the forward direction through the first diode D1 becomes a positive current during the fifth period T25 as illustrated by a one-dot chain line in FIG. 17C.

Further, since the current that flows into the third switch element S3 is substantially 0 A during the fifth period T25 illustrated in FIG. 17, the loss that occurs by the through-current that flows through the third switch element S3 is 0 W as illustrated by a solid line in FIG. 17D.

Figure 23:
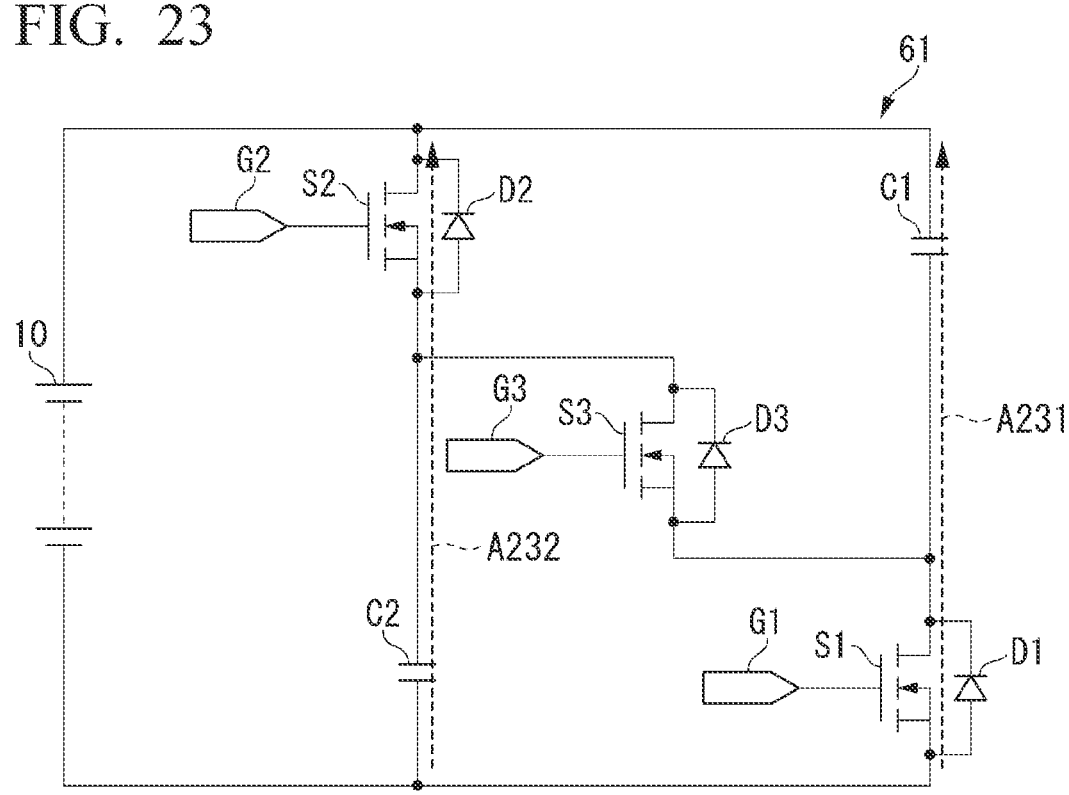
FIG. 23 is a diagram illustrating an example of a current that flows through the AC generation circuit in a sixth period illustrated in FIG. 17.

FIG. 23 is a diagram illustrating an example of a current that flows through the AC generation circuit in a sixth period illustrated in FIG. 17. In the sixth period T26 illustrated in FIG. 17, the first switch element S1 and the second switch element S2 are in an energized state following the fifth period T25, and the third switch element S3 is in the non-energized state. Therefore, as illustrated by the arrow A221 in FIG. 22, the current that flows through the first diode D1 during the fifth period T25 flows through the first switch element S1 as illustrated by an arrow A231 in FIG. 23. In addition, as illustrated by the arrow A222 in FIG. 22, the current that flows through the second diode D2 during the fifth period T25 flows through the second switch element S2 as illustrated by an arrow A232 in FIG. 23.

Further, since the current flows to the first switch element S1 during the sixth period T26 illustrated in FIG. 17, the potential of the source terminal of the third switch element S3 becomes the potential of 0 V of the negative electrode of the power storage body 10 as illustrated by a dotted line in FIG. 17B. Since the second capacitor C2 is discharged during the sixth period T26 illustrated in FIG. 17, the potential of the drain terminal of the third switch element S3 continues to decrease as illustrated by a solid line in FIG. 17B.

Further, since the current does not flow to the third switch element S3 during the sixth period T26 illustrated in FIG. 17, the current that flows into the drain terminal of the third switch element S3 is substantially 0 A as illustrated by a solid line in FIG. 17C. Since the current flows to the first switch element S1 during the sixth period T26 illustrated in FIG. 17, the current that flows into the source terminal of the first switch element S1 becomes a positive current as illustrated by a dotted line in FIG. 17C.

Further, since the current that flows into the third switch element S3 is substantially 0 A during the sixth period T26 illustrated in FIG. 17, the loss that occurs by the through-current that flows through the third switch element S3 is 0 W as illustrated by a solid line in FIG. 17D.

Figure 24:
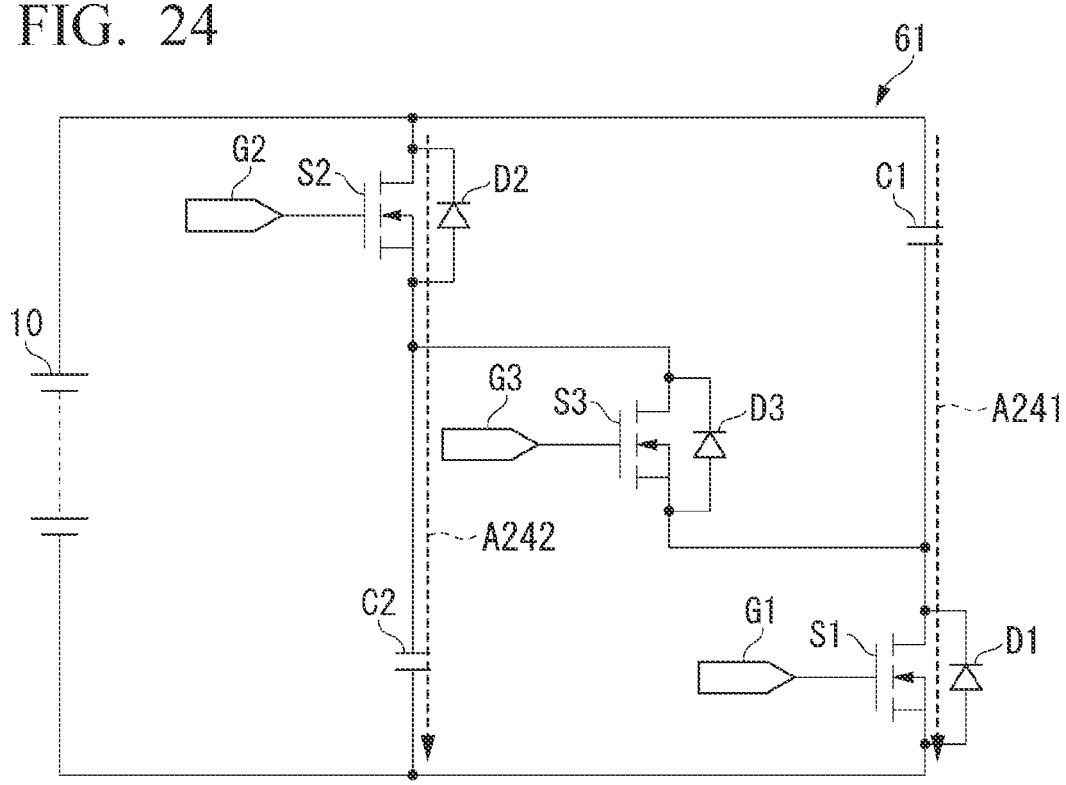
FIG. 24 is a diagram illustrating an example of a current that flows through the AC generation circuit in a seventh period illustrated in FIG. 17.

FIG. 24 is a diagram illustrating an example of a current that flows through the AC generation circuit in a seventh period illustrated in FIG. 17. In the seventh period T17 illustrated in FIG. 17, similar to the third period T23 illustrated in FIG. 17, the first switch element S1 and the second switch element S2 are in a non-energized state, and the third switch element S3 is in an energized state. Further, the first capacitor C1 and the second capacitor C2 are in a state where no electric charge is substantially stored at the end of the third period T23 illustrated in FIG. 17. Therefore, as illustrated by an arrow A241 in FIG. 24, a current flows to the first capacitor C1 and the first switch element S1. The first capacitor C1 is charged by this current. Further, as illustrated by an arrow A242 in FIG. 24, a current flows to the second switch element S2 and the second capacitor C2. The first capacitor C1 is charged by this current.

Further, since the first switch element S1 is in an energized state during the seventh period T17 illustrated in FIG. 17, the potential of the source terminal of the third switch element S3 continues to decrease to a potential equal to the potential of 0 V of the negative electrode of the power storage body 10 as illustrated by a dotted line in FIG. 17B. Since the second capacitor C2 is charged during the seventh period T17 illustrated in FIG. 17, the potential of the drain terminal of the third switch element S3 continues to increase as illustrated by a solid line in FIG. 17B.

Further, since the current does not flow to the third switch element S3 during the seventh period T17 illustrated in FIG. 17, the current that flows into the drain terminal of the third switch element S3 is substantially 0 A as illustrated by a solid line in FIG. 17C. Since the current flows out of the source terminal of the first switch element S1 during the seventh period T17 illustrated in FIG. 17, the current that flows into the source terminal of the first switch element S1 becomes a negative current.

Further, in the seventh period T17 illustrated in FIG. 17, current is not flowing to the third switch element S3.

Therefore, the loss that occurs by the through-current that flows to the third switch element S3 is 0 W as illustrated by a solid line in FIG. 17D.

FIG. 25 is a view illustrating an example of the voltage applied to each of the power storage body, the first capacitor, and the second capacitor when the gate signal illustrated in FIGS. 16 and 17 is supplied to the AC generation circuit, the duty ratios of each of the first switch element, the second switch element, and the third switch element, the current supplied to the power storage body, and the loss that occurs in each of the first switch element, the second switch element, and the third switch element.

FIG. 25A illustrates changes over time in the duty ratios of the first switch element S1, the second switch element S2, and the third switch element S3. Specifically, FIG. 25A illustrates change over time in the duty ratio of the third switch element S3 by a solid line. Further, FIG. 25A illustrates change over time in the duty ratios of the first switch element S1 and the second switch element S2 by a dotted line.

As illustrated by a solid line in FIG. 25A, the switch element control unit 62 according to the second embodiment executes a process of increasing the duty ratio of the third switch element S3 from 0% to 33% at a constant speed. This process is an example of a process of increasing the duty ratio of the third switch element S3 from 0% from the initial state where the first switch element S1, the second switch element S2, and the third switch element S3 are in a non-energized state.

Further, as illustrated by a dotted line in FIG. 25A, the switch element control unit 62 according to the second embodiment executes a process of increasing the duty ratios of the first switch element S1 and the second switch element S2 from 0% to 100% at a constant speed.

Then, as illustrated by a dotted line in FIG. 25A, the switch element control unit 62 according to the second embodiment executes a process of decreasing the duty ratios of the first switch element S1 and the second switch element S2 from 100% to 66% at the same speed as the speed of decreasing the duty ratio of the third switch element S3. As illustrated in FIG. 25A, this process is started at the same time as the start of the process of decreasing the duty ratio of the third switch element S3 from 100% to 66% at a constant speed. Further, this process is an example of a process of decreasing the duty ratios of the first switch element S1 and the second switch element S2 from 100% by the increased amount of the duty ratio of the third switch element S3 from the initial state where the first switch element S1, the second switch element S2, and the third switch element S3 are in a non-energized state.

FIG. 25B illustrates change over time in the voltage applied to the power storage body 10 and the first capacitor C1 or the second capacitor C2 when the gate signal having the duty ratio illustrated in FIG. 25A is supplied to the AC generation circuit 61. Specifically, FIG. 25B illustrates change over time in the voltage applied to the power storage body 10 when the gate signal having the duty ratio illustrated in FIG. 25A is supplied to the AC generation circuit 61 by a solid line. In addition, FIG. 25B illustrates change over time in the voltage applied to the first capacitor C1 or the second capacitor C2 when the gate signal having the duty ratio illustrated in FIG. 25A is supplied to the AC generation circuit 61 by a dotted line.

As illustrated by a solid line in FIG. 25B, the amplitude of the voltage applied to the power storage body 10 increases with the decrease in the duty ratios of the first switch element S1 and the second switch element S2 and the increase in the duty ratio of the third switch element S3. In addition, as illustrated by a dotted line in FIG. 25B, the amplitude of the voltage applied to the first capacitor C1 increases with the decrease in the duty ratios of the first switch element S1 and the second switch element S2 and the increase in the duty ratio of the third switch element S3. Similarly, as illustrated by a dotted line in FIG. 25B, the amplitude of the voltage applied to the second capacitor C2 increases with the decrease in the duty ratios of the first switch element S1 and the second switch element S2 and the increase in the duty ratio of the third switch element S3.

FIG. 25C illustrates the current supplied to the power storage body 10 when the gate signal having the duty ratio illustrated in FIG. 25A is supplied to the AC generation circuit 61. As illustrated in FIG. 25C, the current supplied to the power storage body 10 increases with the decrease in the duty ratios of the first switch element S1 and the second switch element S2 and the increase in the duty ratio of the third switch element S3.

FIG. 25D illustrates the loss that occurs in the first switch element S1, the second switch element S2, or the third switch element S3 when the gate signal having the duty ratio illustrated in FIG. 25A is supplied to the AC generation circuit 61. Specifically, FIG. 25D illustrates the loss that occurs in the first switch element S1 or the second switch element S2 by a solid line. Further, FIG. 25D illustrates the loss that occurs in the third switch element S3 by a dotted line.

As illustrated by a dotted line in FIG. 25D, the loss that occurs in the third switch element S3 increases as the amplitude of the current that flows through the power storage body 10 becomes substantially constant and becomes substantially constant after a predetermined time elapses after the amplitude of the current becomes substantially constant. Further, unlike the loss that occurs in the third switch element S3 in the case of the comparative example, the loss that occurs in the third switch element S3 does not reach the maximum during the increase. Furthermore, as illustrated by a solid line in FIG. 25D, the same applies to the loss that occurs in the first switch element S1 and the loss that occurs in the second switch element S2.

Above, the temperature raising device 60 according to the example has been described. The temperature raising device 60 increases one duty ratio among the duty ratio of the first switch element S1, the duty ratio of the second switch element S2, and the duty ratio of the third switch element S3 from 0% from the initial state where the first switch element S1, the second switch element S2, and the third switch element S3 are in a non-energized state. Further, the temperature raising device 60 decreases another duty ratio among the duty ratio of the first switch element S1, the duty ratio of the second switch element S2, and the duty ratio of the third switch element S3 from 100% by the increased amount of one duty ratio among the duty ratio of the first switch element S1, the duty ratio of the second switch element S2, and the duty ratio of the third switch element S3 from the initial state.

Accordingly, the temperature raising device 60 controls the AC generation circuit 61 such that the through-current does not flow to the third switch element S3 during the reverse recovery time of the first diode D1 and the second diode D2. Therefore, the temperature raising device 60 can reduce the loss that occurs in the third switch element S3 due to the flow of such a through-current.

In the above-described embodiments, a case where the power storage body 10 is a secondary battery has been described as an example, but the present invention is not limited thereto. The power storage body 10 may be, for example, an electric field double layer capacitor or an electrolytic capacitor.

Further, in the above-described embodiments, a case where the first switch element S1, the second switch element S2, and the third switch element S3 are metal-oxide-semiconductor field-effect transistors has been described as an example, but the present invention is not limited thereto. For example, at least one of the first switch element S1, the second switch element S2, and the third switch element S3 may be an insulated gate bipolar transistor (IGBT).

Further, in the above-described embodiments, a case where the first diode D1, the second diode D2, and the third diode D3 are freewheeling diodes has been described as an example, but the present invention is not limited thereto. For example, the first diode D1 may be a parasitic diode of the first switch element S1. Further, for example, the second diode D2 may be a parasitic diode of the second switch element S2. Similarly, the third diode D3 may be a parasitic diode of the third switch element S3.

Furthermore, the switch element control unit 62 according to the first embodiment sets the length of the dead time to be shorter than a predetermined value when at least one of the first diode D1, the second diode D2, and the third diode D3 is a parasitic diode, and adjusts the length to be a length by which generation of a current exceeding a predetermined threshold value can be avoided.

Above, the embodiments of the present invention have been described with reference to the drawings. However, the temperature raising device, the temperature raising program, and the temperature raising method are not limited to the above-described embodiment, and at least one of various modifications, substitutions, combinations, and design changes within a range not deviating from the gist of the present invention can be added.

Moreover, the effects of the embodiments of the above-described present invention are the effects described as an example. Therefore, in addition to the above-described effects, the embodiments of the present invention may also exert other effects that can be recognized by those skilled in the art from the description of the above-described embodiments.

What is claimed is:

1. A temperature raising device comprising:
   a switch element control unit that executes a duty ratio control process of
      increasing one duty ratio which is one of duty ratios of a first switch element and a second switch element and a duty ratio of a third switch element from 0% from an initial state where the first switch element, the second switch element, and the third switch element are in a non-energized state, and
      decreasing another duty ratio which is another of the duty ratios of the first switch element and the second switch element and the duty ratio of the third switch element from 100% from the initial state by an increased amount of the one duty ratio which is one of the duty ratios of the first switch element and the second switch element and the duty ratio of the third switch element,
   with respect to an AC generation circuit including a first capacitor of which one terminal is connected to a terminal of a power storage body, the first switch element connected to another terminal of the first capacitor and the terminal of the power storage body, a second capacitor of which one terminal is connected to the terminal of the power storage body, the second switch element connected to the terminal of the power storage body and another terminal of the second capacitor, and the third switch element connected to the another terminal of the first capacitor and the another terminal of the second capacitor.

2. The temperature raising device according to claim 1, wherein
the switch element control unit executes the duty ratio control process with respect to the AC generation circuit in which at least one of the first switch element, the second switch element, and the third switch element has a parasitic diode.

3. The temperature raising device according to claim 2, wherein
the switch element control unit sets a length of a dead time provided between a state where the first switch element and the second switch element are in an energized state and the third switch element is in a non-energized state, and a state where the first switch element and the second switch element are in a non-energized state and the third switch element is in an energized state, to be shorter than a predetermined value, and to be a length by which generation of a current exceeding a predetermined threshold value is avoidable.

4. The temperature raising device according to claim 1, wherein
the switch element control unit executes the duty ratio control process with respect to the AC generation circuit in which a freewheeling diode is connected to at least one of the first switch element, the second switch element, and the third switch element.

5. The temperature raising device according to claim 4, wherein
the switch element control unit sets a length of a dead time provided between a state where the first switch element and the second switch element are in an energized state and the third switch element is in a non-energized state, and a state where the first switch element and the second switch element are in a non-energized state and the third switch element is in an energized state, to be shorter than a predetermined value, and to be a length by which generation of a current exceeding a predetermined threshold value is avoidable.

6. The temperature raising device according to claim 1, wherein
the switch element control unit executes the duty ratio control process with respect to the AC generation circuit in which at least one of the first switch element, the second switch element, and the third switch element is an insulated gate bipolar transistor or a metal oxide semiconductor field effect transistor.

7. A non-transitory computer-readable non-temporary recording medium storing a temperature raising program that causes a computer to execute a switch element control function of executing a duty ratio control process of:
increasing one duty ratio which is one of duty ratios of a first switch element and a second switch element and a duty ratio of a third switch element from 0% from an initial state where the first switch element, the second switch element, and the third switch element are in a non-energized state; and
decreasing another duty ratio which is another of the duty ratios of the first switch element and the second switch element and the duty ratio of the third switch element from 100% from the initial state by an increased amount of the one duty ratio which is one of the duty ratios of the first switch element and the second switch element and the duty ratio of the third switch element,
with respect to an AC generation circuit including a first capacitor of which one terminal is connected to a terminal of a power storage body, the first switch element connected to another terminal of the first capacitor and the terminal of the power storage body, a second capacitor of which one terminal is connected to the terminal of the power storage body, the second switch element connected to the terminal of the power storage body and another terminal of the second capacitor, and the third switch element connected to the another terminal of the first capacitor and the another terminal of the second capacitor.

8. A temperature raising method comprising:
executing a duty ratio control process of
increasing one duty ratio which is one of duty ratios of a first switch element and a second switch element and a duty ratio of a third switch element from 0% from an initial state where the first switch element, the second switch element, and the third switch element are in a non-energized state, and
decreasing another duty ratio which is another of the duty ratios of the first switch element and the second switch element and the duty ratio of the third switch element from 100% from the initial state by an increased amount of the one duty ratio which is one of the duty ratios of the first switch element and the second switch element and the duty ratio of the third switch element,
with respect to an AC generation circuit including a first capacitor of which one terminal is connected to a terminal of a power storage body, the first switch element connected to another terminal of the first capacitor and the terminal of the power storage body, a second capacitor of which one terminal is connected to the terminal of the power storage body, the second switch element connected to the terminal of the power storage body and another terminal of the second capacitor, and the third switch element connected to the another terminal of the first capacitor and the another terminal of the second capacitor.

* * * * *